(12) United States Patent
Carrig

(10) Patent No.: US 8,176,948 B2
(45) Date of Patent: May 15, 2012

(54) APPARATUS AND SYSTEM FOR LIQUID DISPENSING AND STORAGE

(76) Inventor: Matthew Carrig, Bethesda, MD (US)

( * ) Notice: Subject to any disclaimer, the term of this patent is extended or adjusted under 35 U.S.C. 154(b) by 1085 days.

(21) Appl. No.: 12/055,663

(22) Filed: Mar. 26, 2008

(65) Prior Publication Data

US 2009/0242074 A1     Oct. 1, 2009

(51) Int. Cl.
B65B 3/04      (2006.01)

(52) U.S. Cl. ............... 141/21; 141/25; 141/82; 141/83; 141/359

(58) Field of Classification Search ............... 141/21, 141/25, 82, 83, 95, 104, 363, 351, 359, 360
See application file for complete search history.

(56) References Cited

U.S. PATENT DOCUMENTS

| | | | | |
|---|---|---|---|---|
| 4,030,634 A * | 6/1977 | Osborn | ........................... | 222/23 |
| 4,153,181 A * | 5/1979 | Parker et al. | .................... | 222/61 |
| 5,366,619 A * | 11/1994 | Matsui et al. | ................. | 210/139 |
| 5,992,684 A * | 11/1999 | Russell | .............................. | 222/1 |
| 6,182,453 B1 * | 2/2001 | Forsberg | ........................... | 62/125 |
| 6,532,760 B2 * | 3/2003 | Davis | ............................... | 62/392 |
| 6,561,382 B2 * | 5/2003 | Shelton | ............................... | 222/1 |
| 6,830,661 B1 * | 12/2004 | Land | ............................... | 202/83 |
| 7,114,637 B2 * | 10/2006 | Davis | ............................ | 222/146.6 |
| 7,150,163 B1 * | 12/2006 | McAllister | ..................... | 62/389 |
| 7,175,054 B2 * | 2/2007 | Davis et al. | .................... | 222/190 |
| 7,217,343 B2 * | 5/2007 | Land | ............................... | 203/1 |
| 7,258,803 B2 * | 8/2007 | Davis | ............................ | 210/760 |
| 7,422,684 B1 * | 9/2008 | Davis et al. | .................... | 210/192 |
| 7,434,603 B2 * | 10/2008 | Spear et al. | ................... | 141/363 |
| 7,640,766 B2 * | 1/2010 | Shelton | ............................ | 62/389 |
| 7,655,150 B2 * | 2/2010 | Davis | ............................ | 210/760 |
| 2004/0129723 A1 * | 7/2004 | Meder et al. | ................. | 222/113 |

* cited by examiner

Primary Examiner — Gregory Huson
Assistant Examiner — Nicolas A Arnett
(74) Attorney, Agent, or Firm — Frommer Lawrence & Haug LLP

(57) ABSTRACT

A liquid dispensing vending system that includes a closed, integrated system of bottles and dispensing machines. The bottles used with the instant dispensing system are designed to minimize the growth of mold, mildew, bacteria and other harmful micro organisms. The vending system may be used to dispense water, soft drinks, coffee, tea, water with nutrients, and/or antioxidants, into containers such as rugged bottles capable of being reused many times. The bottles are designed to be refilled by the dispensing machines, and therefore are tamper resistant. The bottles are made of an antimicrobial plastic and their contents are stored under pressure to discourage bacterial and organic growth inside the bottle.

19 Claims, 15 Drawing Sheets

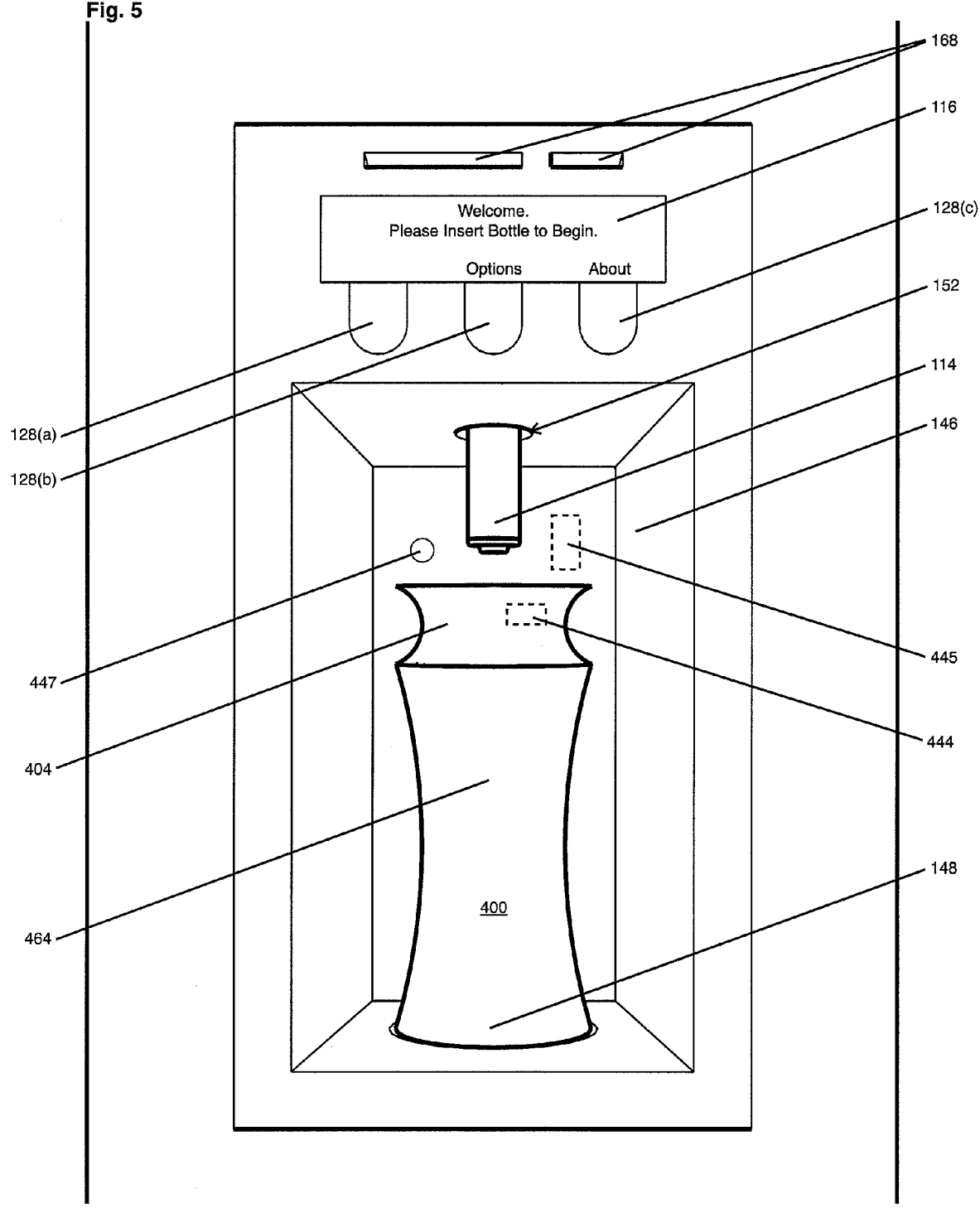

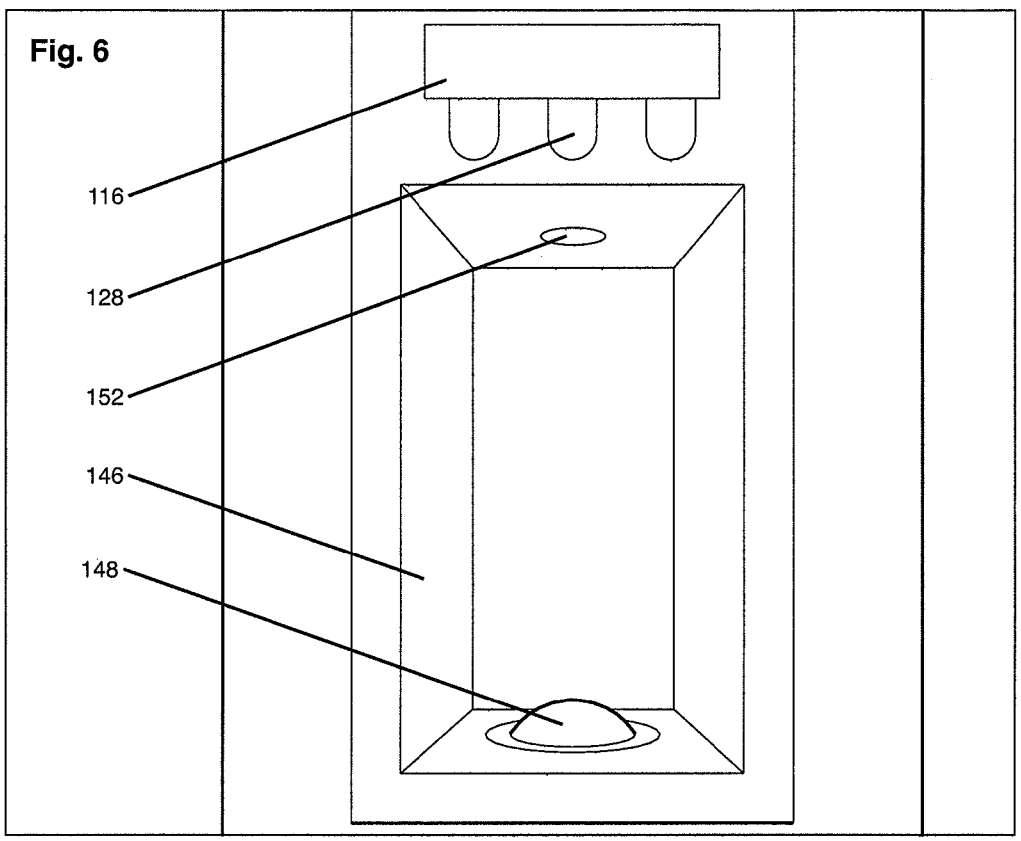
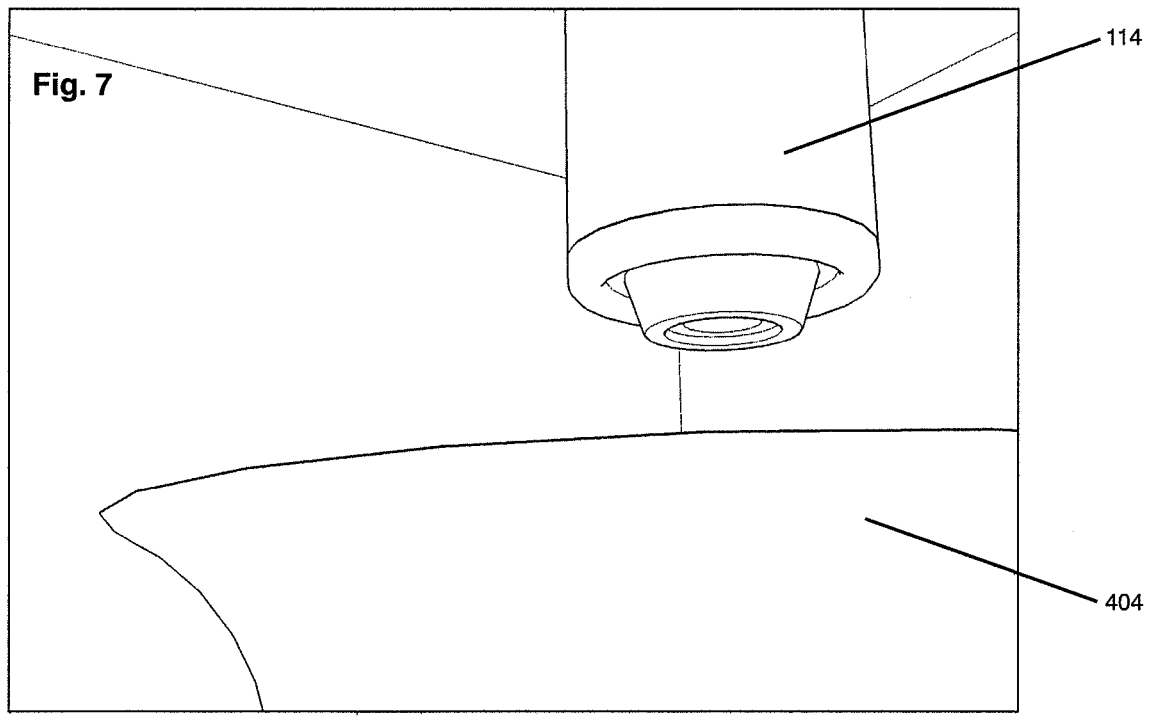

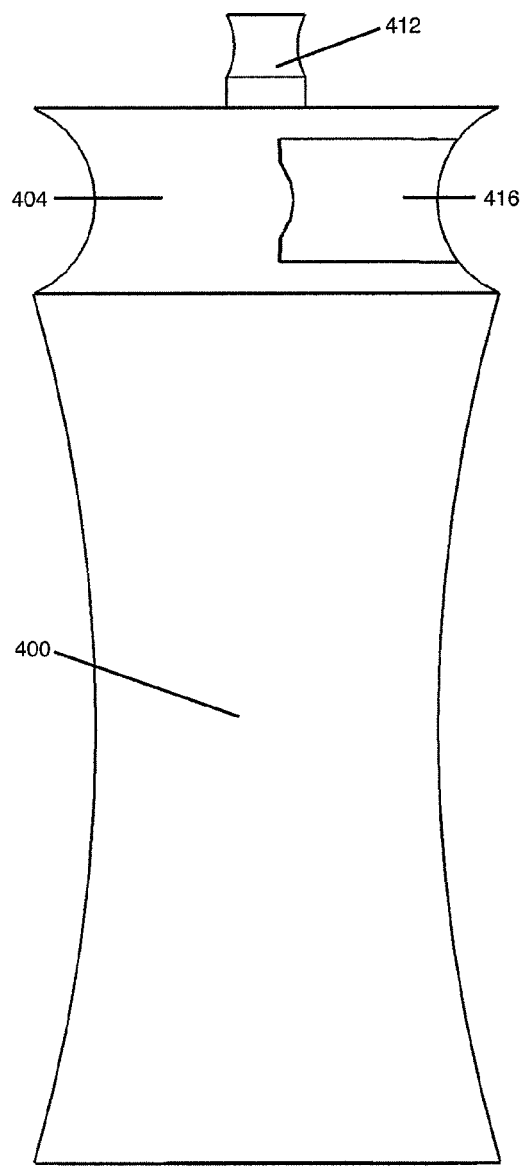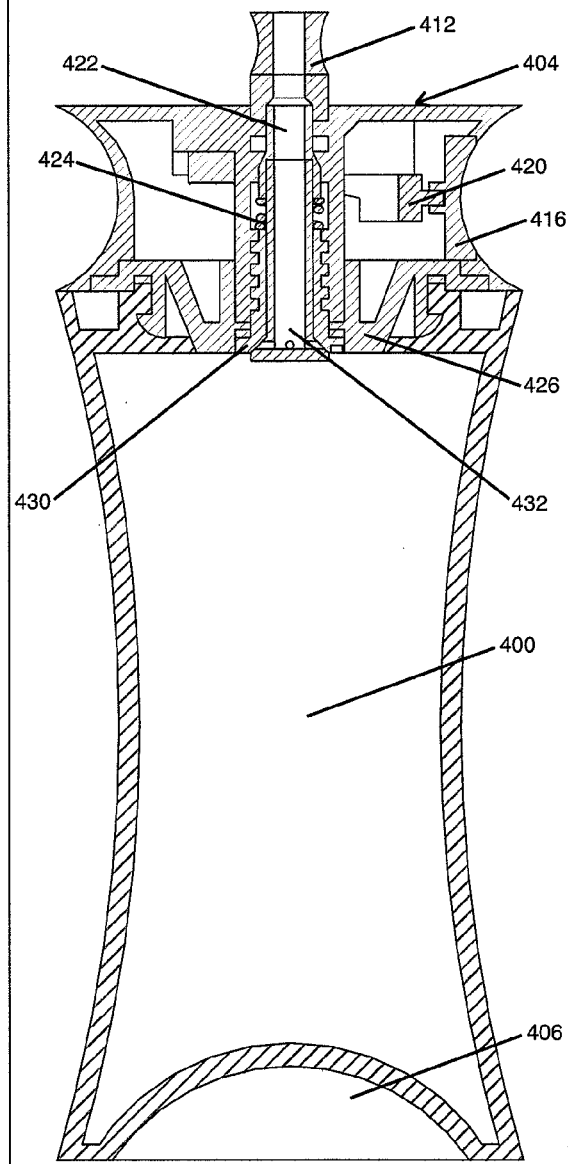

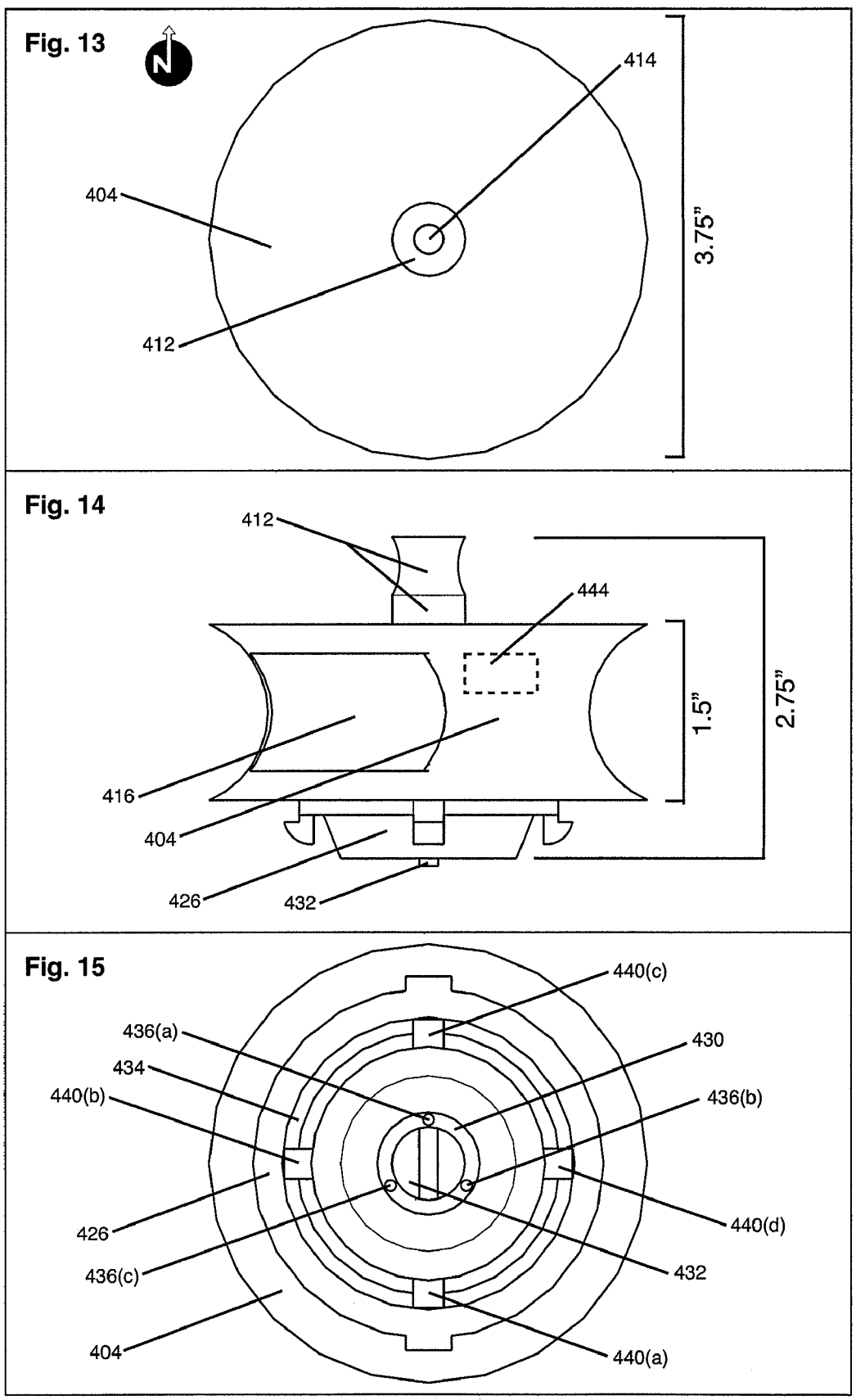

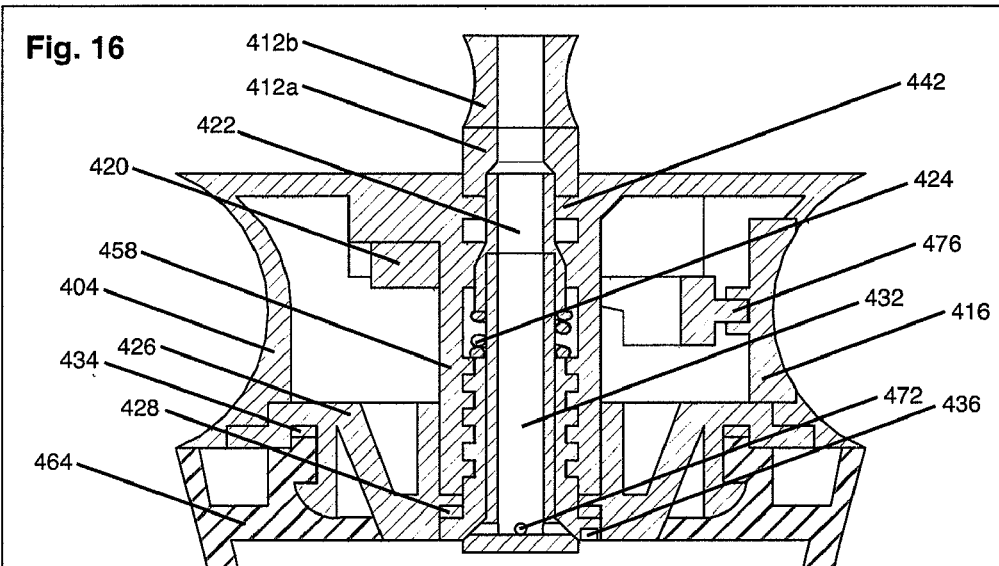
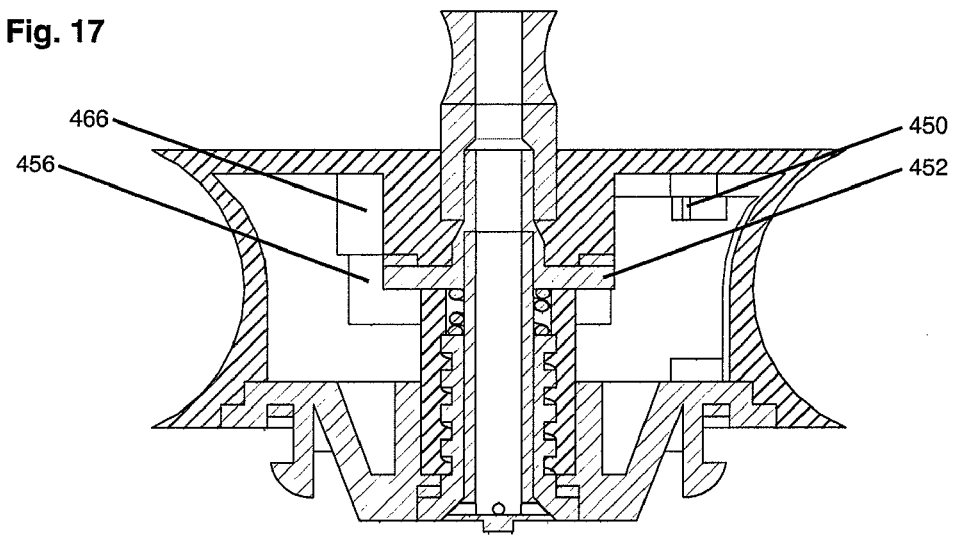
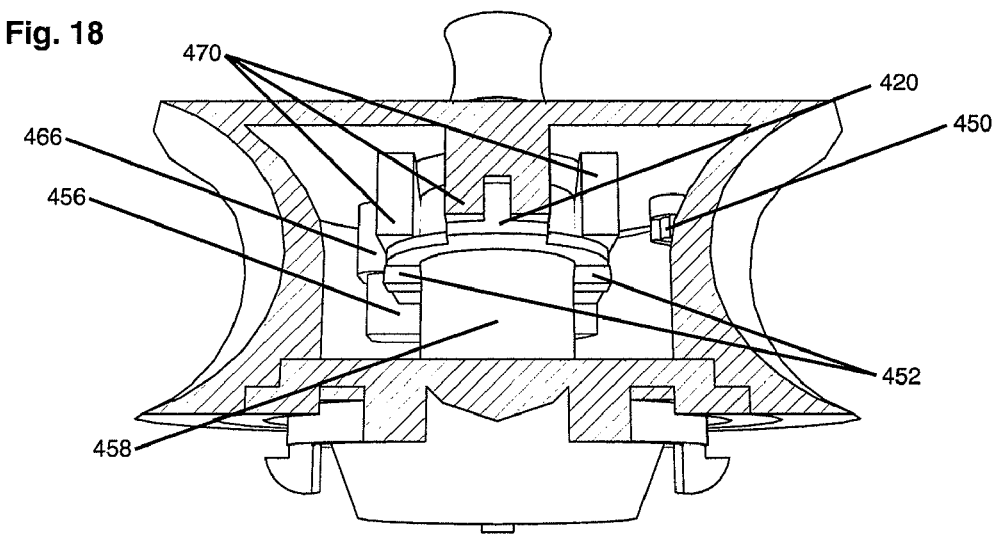

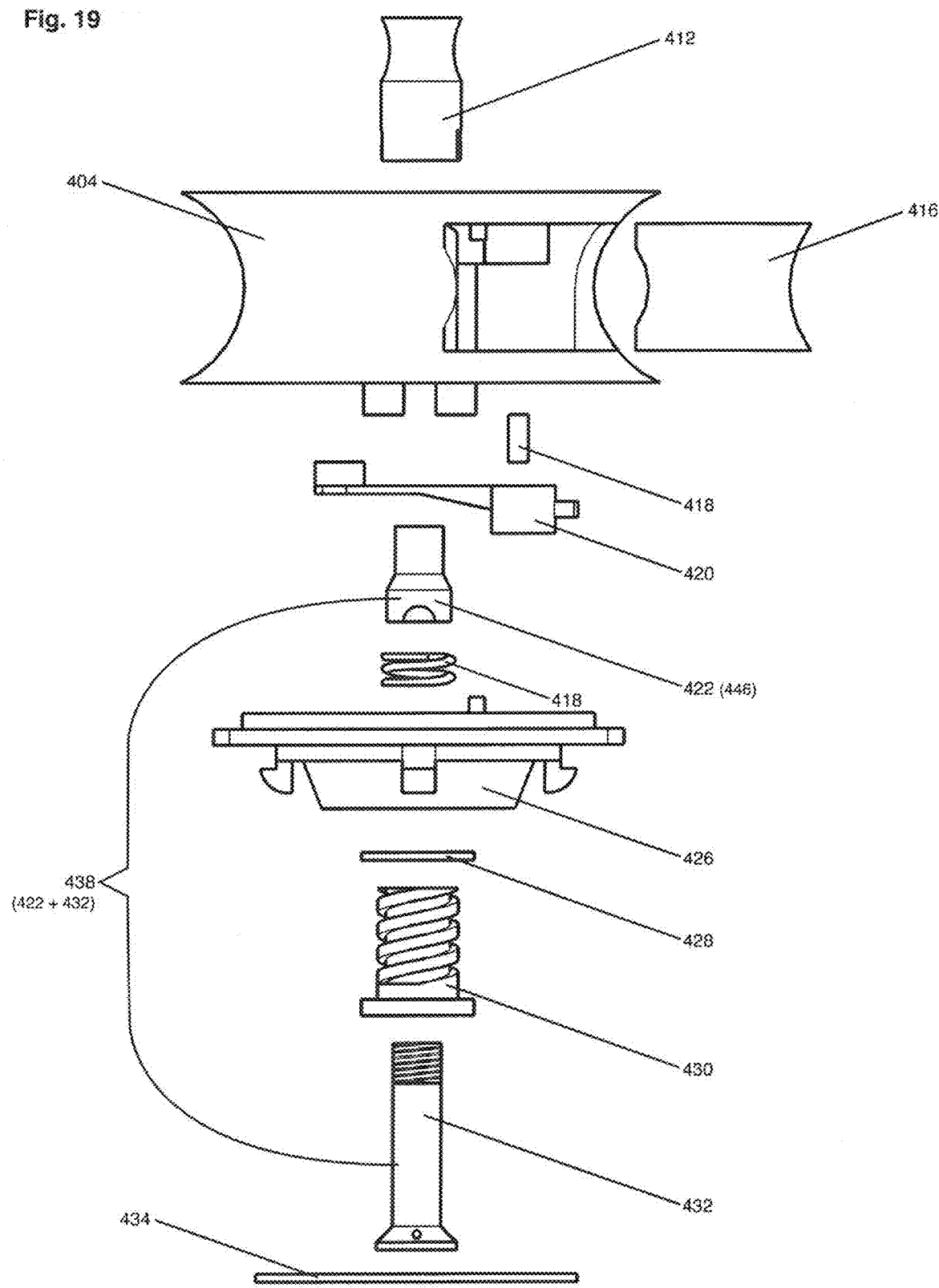

APPARATUS AND SYSTEM FOR LIQUID DISPENSING AND STORAGE

BACKGROUND

1. Field of the Invention

The instant invention relates generally to liquid dispensing machines and containers that can be filled from the liquid dispensing machines. More particularly, the invention relates to a liquid dispensing machine that is designed to dispense a liquid into a container, such as a bottle, that is specifically designed to be filled with a liquid dispensed from the liquid dispensing vending machines and the number of refills are tracked.

2. Background Discussion

Conventional vending machines typically dispense prepackaged food and beverages, one example being bottled water. Beverage dispensing machines may also dispense water from a source. Such vending machines typically include a metal machine cabinet which houses a water purification system such as a reverse osmosis and/or filtration system for producing a supply of water from a tap water source. The vending machine cabinet normally defines a forwardly open dispense chamber into which a customer can place a water bottle or container beneath a dispensing nozzle. A control panel on the machine cabinet is then manipulated by the user, in conjunction with the deposit of an appropriate payment via one or more coin slots or the like, to activate the machine to dispense a selected volume of purified water into the customer-supplied bottle. Vending machines of this type are commonly available at many shopping centers, supermarkets and other public places to provide a convenient source of food and beverages.

However, in the above-described conventional vending machines, the discharge end of the dispense nozzle is typically exposed at the upper side of the open dispense chamber, where the dispense nozzle can be manually grasped or otherwise contacted by foreign objects from the exterior of the vending machine. Such exposure unfortunately subjects the dispense nozzle to inadvertent contamination as well as deliberate vandalism.

Also, when water is dispensed from such a machine, the container or bottle that receives the water may not be sanitary. Because these water vending machines are located in public places, a user may not have the facilities available to clean the water or liquid receiving bottle after each use or prior to refilling. Consequently, harmful micro organisms may grow in the unclean bottle.

The present invention provides an improved liquid dispensing system.

SUMMARY OF THE INVENTION

Accordingly, the present invention relates to a liquid dispensing system that has a dispensing unit and a container.

One embodiment of the present invention is directed to an apparatus that includes a dispensing unit. The dispensing unit includes a filtration unit adapted to filter a liquid. A reservoir unit for containing a supply of liquid to be dispensed. A pump unit is operatively coupled to the reservoir unit, to pump the liquid from the reservoir unit. A conduit unit is operatively coupled to the reservoir unit, to dispense liquid. The conduit unit has a retractable unit and an orifice. A compressor unit is operatively coupled to the conduit unit, to provide pressurization of the receptacle to store the liquid under pressure to facilitate subsequent discharge of the liquid from the receptacle. A sterilization unit is operatively coupled to the filtration unit for sterilizing the liquid prior to dispensing into the receptacle. A control unit is operatively coupled to the conduit unit for controlling liquid dispensed by the conduit unit.

Another embodiment of the present invention is directed to a receptacle unit that includes a container unit for containing liquid and a lid unit, attachable to the container unit. The lid unit discharges liquid due to the pressure in the receptacle.

Yet another embodiment is directed to a receptacle that is pressurized to a particular pressure to facilitate dispensing liquid from the receptacle. The pressurization may be implemented via a lever that is pumped to pressurize the internal contents of the bottle and/or a bladder that expands to provide internal pressure.

Yet another embodiment is directed to a lid unit that includes a body member having an actuator unit and a base member.

Yet another embodiment is directed to the apparatus and also includes a compressed gas unit adapted to provide compressed gas to the receptacle unit.

Yet another embodiment is directed to the apparatus wherein the compressed gas unit is detachable from the receptacle unit.

Yet another embodiment is directed to the apparatus wherein the compressed gas unit is adapted to be recharged by dispensing unit.

Yet another embodiment is directed to the apparatus wherein the compressor unit provides compressed gas that is added to the liquid to form a mixture and the mixture is dispensed by the conduit unit.

Yet another embodiment is directed to the apparatus wherein the receptacle is depressurized by the dispensing unit.

Yet another embodiment is directed to the apparatus and also includes a pressure gauge unit adapted to sense an internal pressure of the receptacle.

Yet another embodiment is directed to the apparatus wherein the pressure gauge is disposed in the dispensing unit.

Yet another embodiment is directed to the apparatus wherein the pressure gauge is disposed in the receptacle.

Yet another embodiment is directed to the apparatus wherein the conduit unit dispenses compressed gas based on the volume of the liquid in the receptacle.

Yet another embodiment is directed to the apparatus that also includes a mass sensing unit adapted to sense the mass of the receptacle. The mass sensing unit determines a mass of the receptacle to determine an amount of liquid to dispense and the conduit unit provides the determined amount of liquid and the pressure gauge determines an amount of pressurization for the receptacle based on the liquid dispensed.

Yet another embodiment is directed to the apparatus wherein the receptacle is adapted to be repeatedly pressurized.

Yet another embodiment is directed to the apparatus wherein the receptacle is adapted to be repeatedly filled.

Yet another embodiment is directed to the apparatus that also includes a first RFID transceiver unit disposed in the receptacle for storing information related to the receptacle.

Yet another embodiment is directed to the apparatus that also includes a second RFID transceiver unit disposed in the dispensing unit.

Yet another embodiment is directed to the apparatus wherein the second RFID transceiver unit obtains information from the first RFID transceiver unit.

Yet another embodiment is directed to the apparatus wherein the first RFID transceiver unit transmits user data to the second RFID transceiver unit, and the user data is used by the dispensing unit to dispense liquid into the receptacle.

Yet another embodiment is directed to the apparatus wherein the user data includes preference data and/or account data.

Yet another embodiment is directed to the apparatus wherein the first RFID transceiver unit accumulates receptacle information.

Yet another embodiment is directed to the apparatus wherein the receptacle information includes receptacle capacity, volume of liquid in the receptacle, and internal pressure of the receptacle.

Yet another embodiment is directed to the apparatus and also includes an optical sensing unit, mounted on the dispensing unit that is adapted to optically sense a volume level of a receptacle.

Yet another embodiment is directed to the apparatus wherein the pressure of the receptacle is input from the dispensing unit.

Yet another embodiment is directed to the apparatus and also includes a pressure tank mounted in the dispensing unit.

Yet another embodiment is directed to the apparatus wherein the receptacle includes a pressurizing unit that provides pressure to the receptacle.

Yet another embodiment is directed to the apparatus wherein the pressurizing unit includes an actuatable member, such as a pump, lever or other mechanism to generate pressure, that upon actuation generates internal receptacle pressure.

Yet another embodiment is directed to the apparatus wherein the receptacle is operable with one or more predetermined dispensing units.

Yet another embodiment is directed to a liquid container that includes a fluid containing portion and a lid portion that is operably connected to the fluid containing portion. A pressure sensing unit senses an internal pressure level of the liquid container. A volume sensing unit senses a volume of the container.

Yet another embodiment is directed to the liquid container and also includes an RFID transceiver mounted on the liquid container.

Yet another embodiment is directed to the liquid container wherein the RFID unit stores information related to the liquid container.

Yet another embodiment is directed to the apparatus that also includes a plurality of dispensing units and a network. The plurality of dispensing units are in communication with each other via the network.

Yet another embodiment is directed to a method for dispensing liquid. The method includes inserting a container into a filling unit. The container is identified based on container information stored in the container. Container characteristics are established based on the container information. A predetermined volume of liquid is dispensed into the container and gaseous pressure is applied into the container.

Yet another embodiment is directed to the method wherein the dispensing step further includes selecting a dispensing operation based on the container characteristics.

Yet another embodiment is directed to the method and also includes decreasing an account balance, associated with a container, based on the liquid dispensed.

Yet another embodiment is directed to the method and also includes adding funds to an account and increasing an account balance, associated with a container, based on the added funds.

Yet another embodiment is directed to the method and also includes transmitting the container information via a network user account.

Yet another embodiment is directed to the method and further includes displaying message data based on the container information.

Yet another embodiment is directed to the method and also includes depressurizing the container.

Yet another embodiment is directed to the apparatus in which the dispensing unit also includes a plurality of conduit units. The conduit units are disposed on the dispensing unit in a position to enable liquid to be dispensed into a plurality of receptacles at the same time.

Yet another embodiment is directed to the apparatus wherein the apparatus applies funds received by one receptacle to another receptacle.

Yet another embodiment is directed to the apparatus that also includes an RFID tag associated with a receptacle that is located remotely from the receptacle.

Yet another embodiment is directed to the apparatus wherein the dispensing unit is adapted to dispense a plurality of types of liquid. The types of liquid include, for example carbonated water, desalinated water, and boiling water, soda, juice.

Yet another embodiment is directed to the apparatus wherein the filtering unit performs a plurality of types of filtration.

Yet another embodiment is directed to the apparatus wherein the conduit unit controls addition of one or more additives to the dispensed liquid. The additives include flavoring, protein and nutrients and antioxidants.

Yet another embodiment is directed to the apparatus wherein the first RFID transceiver unit stores user preference data.

Yet another embodiment is directed to the apparatus wherein the receptacle is tamper proof and may receive liquid from an authorized dispensing unit.

Yet another embodiment is directed to the apparatus wherein the dispensing apparatus is adapted to dispense receptacles. Thus a user can obtain a container from a dispensing machine.

Yet another embodiment is directed to the apparatus wherein the dispensing apparatus cleans receptacles. This may be achieved by applying oxygenated water, or ozinated water.

Yet another embodiment is directed to the apparatus wherein the dispensing apparatus sterilizes contents of the receptacle.

Yet another embodiment is directed to the apparatus wherein the conduit unit does not contact the receptacles.

Yet another embodiment is directed to the apparatus wherein the receptacle has a pressure release mechanism to remove excess pressure in a receptacle.

Yet another embodiment is directed to the apparatus wherein the liquid in the dispensing unit is moved through compressed air to push liquid inside the dispensing unit.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 5 shows a view of the dispensing nozzle and receptacle according to the present invention;

FIG. 6 shows a mounting area for a receptacle according to the present invention;

FIG. 7 shows the dispensing nozzle and an upper portion of the receptacle according to the present invention;

FIG. 11 shows a side view of the receptacle according to the present invention;

FIG. 12 shows a cross-sectional view of the receptacle according to the present invention;

FIG. 13 shows a top view of the receptacle according to the present invention;

FIG. 14 shows another view of the receptacle top according to the present invention;

FIG. 15 shows a bottom view of the receptacle top according to the present invention;

FIG. 16 shows another cut-away view of the top of the receptacle according to the present invention;

FIG. 17 shows yet another cut-away view of the top of the receptacle according to the present invention;

FIG. 18 shows a perspective cut-away view of the top of the receptacle according to the present invention;

FIG. 19 shows an expanded view of the top of the receptacle according to the present invention;

DETAILED DESCRIPTION

The instant invention will now be described with reference to the accompanying drawings in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

The instant invention is directed to a liquid dispensing vending system comprised of a closed, integrated system of bottles and dispensing machines. The bottles to be used with the instant system are designed to minimize the growth of mold, mildew, bacteria and other harmful micro organisms. The instant liquid vending system may be used to dispense, for example, water, soft drinks, coffee, tea, water with nutrients, antioxidants, etc. The dispensing machines dispense liquids to containers such as rugged bottles capable of being reused many times. The bottles are designed to be refilled by the instant dispensing machines, and therefore are tamper resistant. Because the bottle cannot be opened, cleaning the bottle is not an option. Consequently, the bottles are made of an antimicrobial plastic and their contents are stored under pressure to discourage bacterial and organic growth inside the bottle.

When a button on the bottle is pressed, pressure within the bottle propels the liquid from the bottle, creating a one-way liquid stream for drinking while preventing the introduction of outside particulates. The containers can be taken to any compatible dispensing machine to be refilled and pressurized.

Figure 1:
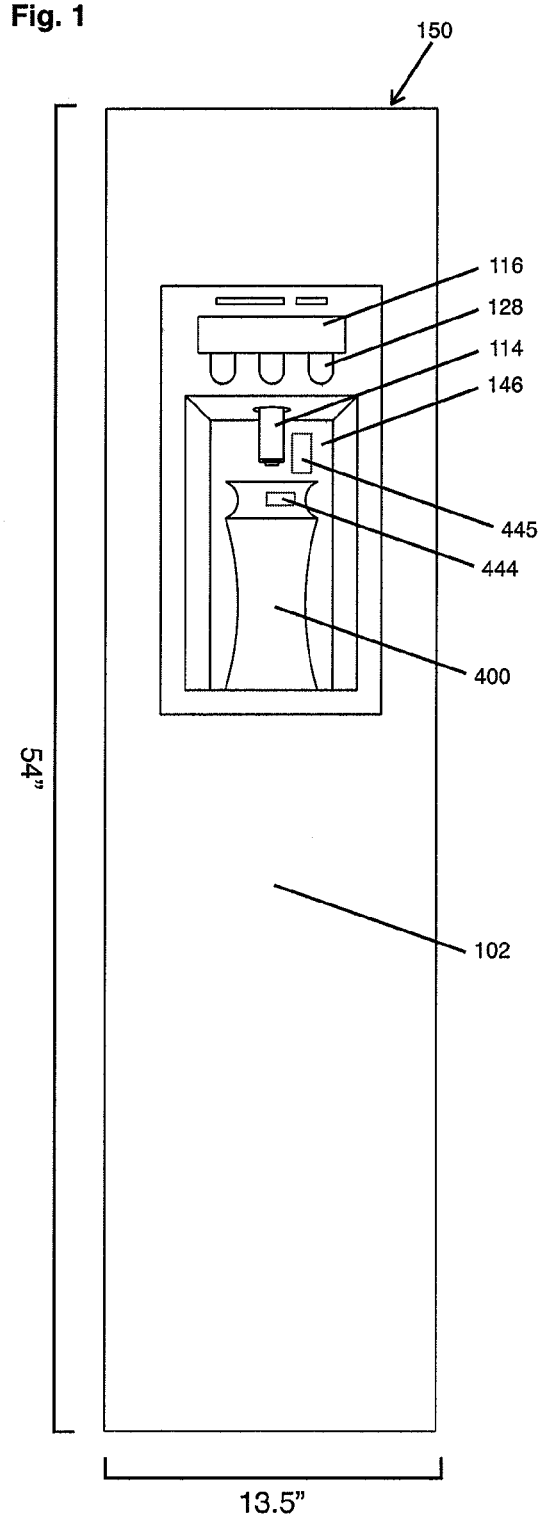
FIG. 1 shows a dispensing system according to the present invention.

FIG. 1 shows a dispensing system according to the present invention. Outer casing 102 contains the various components and elements of the dispensing system. Upper portion 150 is also shown. Receptacle 400 is shown positioned in receptacle mounting area, or receptacle cavity, 146 so as to receive liquid dispensed via exterior nozzle assembly 114. As shown, the receptacle, or container, or bottle 400 has an RFID transceiver, or transponder, chip 444 disposed or mounted or embedded in the container 400. An LCD (liquid crystal display) 116 is provided to display message data, such as the amount of money due, amount of funds remaining in a user's account, beverage selection information such as type of beverage selected, temperature of beverage, etc. Selection buttons 128 that enable a user to select a type of beverage are also provided. A transponder or transceiver chip, such as an RFID chip 445 is mounted or disposed or embedded in a portion of the outer casing 102.

Figure 2:
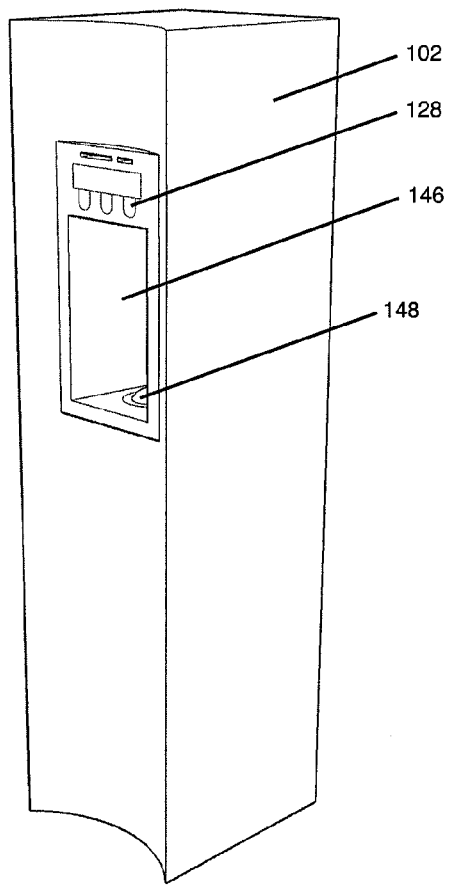
FIG. 2 shows another view of the dispensing system according to the present invention.

FIG. 2 shows another view of the dispensing system according to the present invention. Indeed, FIG. 2 shows a receptacle mount 148 disposed in receptacle cavity 146. The mount 148 may interface with a corresponding concave surface of receptacle 400. Outer casing 102 and selection buttons 128 are also shown.

Figure 3:
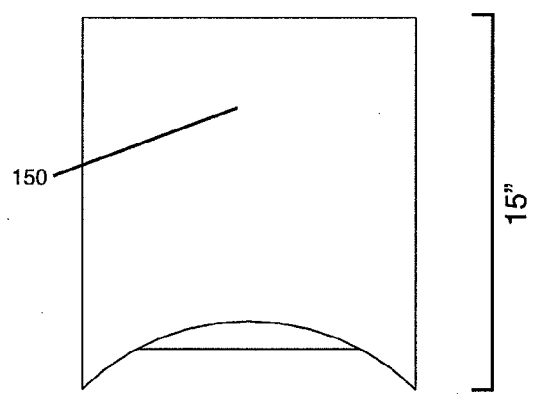
FIG. 3 shows a top view of the dispensing system according to the present invention.

FIG. 3 shows a top view of the dispensing system, specifically top portion 150.

One embodiment of the instant invention relates to a machine for dispensing a liquid to a container, such as a bottle, which is designed to specifically receive a liquid from a compatible liquid dispensing machine. That is, in order for the machine to dispense a liquid, a compatible bottle or container must be used.

In one embodiment, the liquid dispensing machine dispenses purified tap water to compatible containers, receptacles, or bottles. In this embodiment, the machine is a water filtering, a bottle sterilizing, and a vending machine that is part of a closed system for drinking water. It serves as a filling and pressurizing station for the compatible, reusable bottle, which will be discussed in more detail below.

The instant dispensing machine may include a water supply, which may be, for example a source of water, such as a five-gallon jug mounted water dispenser. The dispensing machine can be placed in almost any location provided there is an available water supply line and source of electrical power. The machines can be used, for example, on college campuses, gas stations, shopping malls, fitness centers, schools, grocery stores, municipal buildings, movie theaters, airports, railway stations, public parks, as well as in office buildings and private residences.

Figure 4:
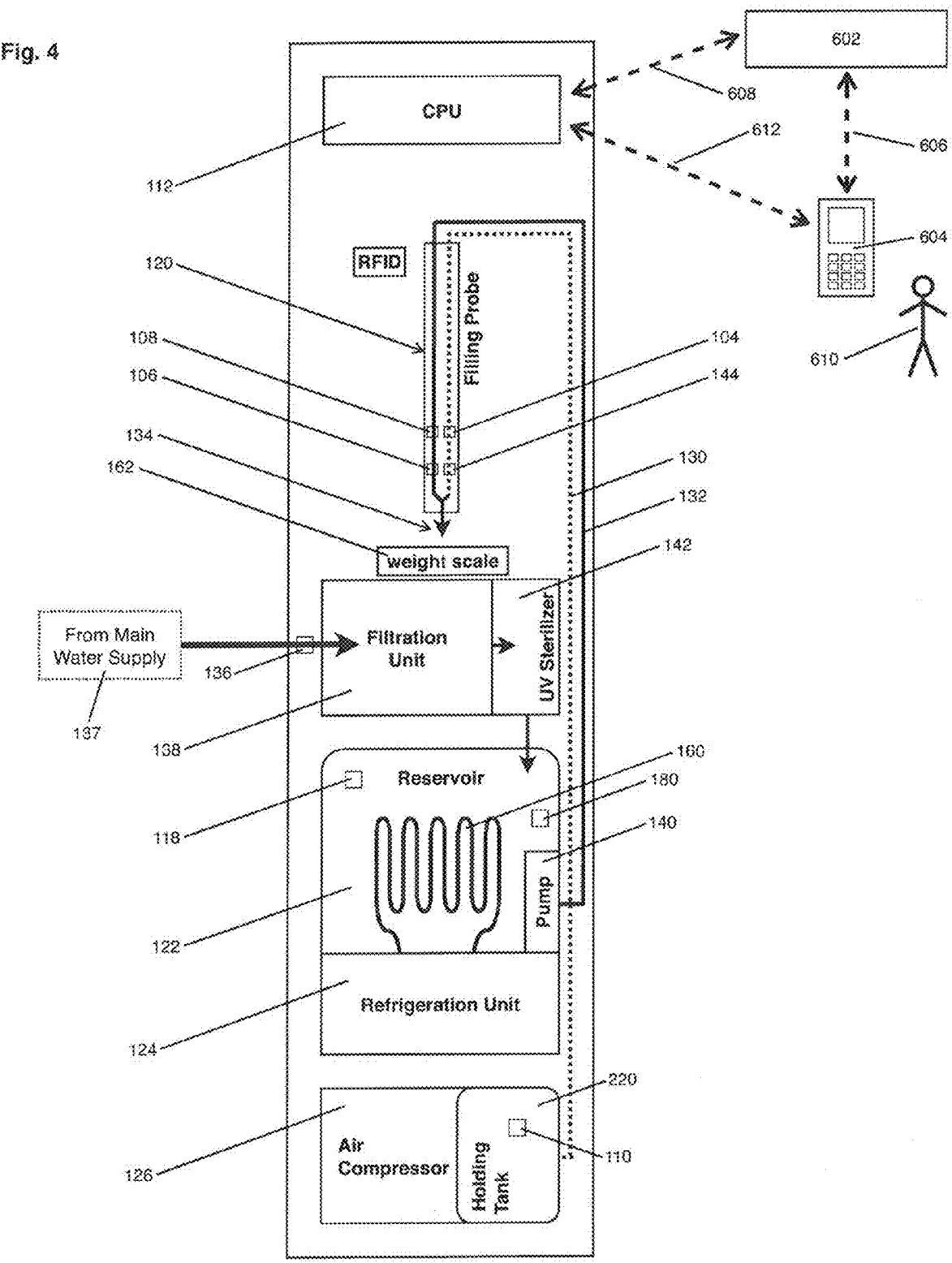
FIG. 4 shows a cut-away view of the dispensing system according to the present invention.

FIG. 4 shows a cut-away view of the dispensing system according to the present invention. The system includes a filtration unit 138, a sterilizing unit 142, including a UV sterilizer, cooling with a refrigeration unit 124, storing liquid, by way of a reservoir 122, and dispensing water, or other liquid. It is also an embodiment of the invention that a plurality of reservoirs may be used to store a variety of liquids to be dispensed. These liquids include, for example, water, purified water, nutrient water, tea, carbonated beverages, lemonade, and other suitable beverages.

The liquid dispensing machine includes an air compressor 126, a CPU 112, an interface, screen, (shown as 116 in FIG. 1) a radio frequency identification (RFID) transceiver or transponder 445 mounted or disposed or embedded in the dispensing unit, a weighing scale 162, a filling probe 120, volume meter 108, water line valve 106, air line valve 104, nozzle 134, pressure gauge 144, water line 132, pressure line 130, water line and valve 136, used to provide water from an outside water source to filtration unit 138, air pressure gauge 110, holding tank 220, for holding pressurized gas, pump 140, thermometer 180 and coil 160.

The filtration unit 138 is used to remove common solid and chemical contaminants from the local water supply. The filtration unit 138 has a long filter operational life and requires little maintenance. Based on the characteristics of the public drinking water in the region where the machine is to be used, the filtration unit 138 can be produced with filtration abilities directed to the characteristics of the supply water. For example, different filtration requirements will be necessary for reservoir water, well water, water from an aquifer, hard and soft water and for desalinization.

One purification method that may be used to purify water of the present invention is by reverse osmosis, however, as will be apparent to those skilled in the art, any method may be used that purifies the water in accordance with government regulations. Reverse osmosis purifies over a wide range and it is able to trap rust and other larger particles while expunging organic chemicals and it is also capable of dechlorination.

The instant invention is also capable of sterilizing the water prior to dispensing. The water is sterilized not only because it is intended for consumption but also because it may not be consumed immediately following the purification process, as the purified water is sent to the reservoir 122 for holding liquid prior to dispensing. In addition, after filling, the purified water may stay in the bottle, or receptacle (400) as well, which for its own specific reasons, requires minimal microbiological presence.

In one embodiment, an ultraviolet (UV) sterilization unit 142 is used as a bactericide. The UV sterilization is highly effective and inexpensive but other sterilization techniques could be used. As water leaves the filtration unit 138, it enters the UV sterilizer 142 where it is exposed to ultraviolet light for a duration adequate to substantially eliminate any microbiological organisms contained within the filtered water. For example between approximately 10-60 seconds.

After the water is sterilized, it enters a water reservoir 122, which is typically a tank for holding the filtered and sterilized water. In the reservoir 122, the water temperature is set to approximately 40° F. by way of a refrigeration unit 124. An electronic thermostat inside the reservoir 122 maintains the water at the desired temperature. Preferably, the reservoir 122 made of a corrosion resistant metal such as for example, stainless steel. Additionally, a food-grade plastic or antimicrobial plastic may also be used.

The reservoir's capacity is, for example two gallons so that filling demands can be met during busy periods. When the reservoir 122 reaches its maximum capacity, an electronic sensor 118 is triggered, thereby closing an electronic valve 106 between the main water line 136 and the filtration unit 138. Further, when the water level in the reservoir 122 drops below a desired level, another electronic sensor (not shown) is triggered, thereby opening the electronic valve 136 between the main water line and the filtration unit 138, allowing additional, untreated supply water to enter the filtration unit 138 for processing and filling of the reservoir 122. When needed, such as when a customer pays to refill a bottle, purified water is transported from the reservoir 122 to the filling probe 120 by way of a hydraulic pump 140. Alternatively, compressed air from an air holding tank 220 could be used to increase the pressure within the reservoir 122 in order to transport the water from the reservoir 122 to the filling probe 120.

In order to cool the purified water and keep the water cold, a cooling unit 124 may be used. The cooling unit 124 typically includes a compressor, a refrigerant, and cooling coils 160. Cooling of the purified water is by way of the cooling coils 160 that are located within the reservoir 122. A thermostat 180 in the reservoir 122 switches the cooling unit 124 on or off based on the desired temperature of the dispensed water.

As will be discussed in more detail below, the compatible bottle, or receptacle, shown as element 400 herein, that is used with the instant dispensing machine is pressurized. Pressurization of the bottle inhibits any outside contaminants such as organic or inorganic particulates from entering the bottle when a liquid is dispensed by the user. Therefore, in order to pressurize the bottles upon filling, an air compressor 126 is included within the dispensing machine. In use, ambient air outside the dispensing machine is drawn into the compressor 126 for pressurization. Prior to being compressed, the air is drawn through an air filter (not shown) to remove airborne particles, preventing later entrance into and contamination of a bottle. The compressor 126 is typically capable of producing approximately between 0.5 and 100 psi of pressure. A holding tank 220 for storing the compressed air is also included within the dispensing machine thereby avoiding the need for activating the compressor 126 during every bottle refill. A pressure gauge 144 monitors the holding tank 220 pressure and switches the compressor 126 on and off as needed.

Operation of the dispensing machine is achieved by user interface 116, which may be touch sensitive GUI, LCD screen or plasma screen, or any combination thereof, located on the front of the dispensing machine as depicted herein. In one embodiment, a high contrast, display, such as a monochromatic screen, displays information and provides visual feedback to a customer while using the interface 116.

In one embodiment, three buttons 128(*a*) (*b*) and (*c*) (generally referred to as 128 herein) lie directly below a screen, or interface 116. The function of the three buttons 128 changes as indicated on the screen 116 in response to a customer's input. The interface 116 gives the customer options to, for example, credit their bottle, re-pressurize a partly filled bottle, and obtain information on the system or their bottle. An example of the navigational layout of the menu can be seen in FIG. 8. An RFID chip 445 is located on the dispensing unit and a second RFID chip 444 is located on the receptacle 400.

In order for a user to dispense liquid from the machine, the user must provide payment. Accordingly, the machine includes a money collecting unit 168 on its exterior with receptacles for both coin and paper currency. Feedback for the currency entered is displayed on the screen 116. Additional payment methods may also be accepted by the machine, such as, credit/debit cards and RFID based credit cards or magnetic or RFID cards that are for specific use with the machine. With these additional forms of payment, corresponding readers are included on the dispensing machine.

Each refill may be paid for by the customer using any of the previously disclosed payment methods prior to each refill. However, in order to facilitate a quick transaction without a user having to input money or payment card, the bottle designed for use with the dispensing machine, however, contains an RFID chip so that it may be loaded with credit for future refills. Therefore, whenever a bottle is docked in the dispensing machine, wireless communication is made between the transponder chip in the bottle and a transceiver 164 in the machine. The machine is able to determine the amount of credits a bottle has remaining and automatically administers a refill and deducts the correct amount from the credit remaining on the transponder chip. Additional refill credits can be uploaded to the bottle from the machine for redemption at any machine.

The dispensing machine may also be designed with the ability to give change to a customer, both coins and bills. Alternatively, no change may be provided so that money inserted beyond the price of a single refill will be added to the credit remaining on the transponder chip on the bottle. For example, if a refill costs 25 cents and a dollar bill were inserted, exactly 4 fill credits would be credited to the bottle. If an amount of money was inserted that was not evenly divisible by the cost of a refill, (e.g. $1.07) the extra credit beyond the closest evenly divisible amount would be uploaded on the chip as partial credit. Partial credit would be accumulated over time until the cost of a single total credit was reached, in this case, 18 more cents. Once a customer pays for a refill, the bottle is ready to be refilled.

Refilling of a container occurs by using a filling probe 120. The filling probe 120 is typically a vertical tube-like structure used to fill a docked bottle (a bottle positioned in the dispensing machine). A line 132 for filtered water runs from the hydraulic pump 140 downward through the filling probe 120 to the bottom of the probe 120 and a line 130 for pressurized air runs from the holding tank 220 downward through the filling probe 120 to the bottom of the probe 120 as well. Both supply lines, 130, 132 meet at the bottom of the filling probe 120. As shown herein, the filling probe tip includes an attachment, typically made of rubber, that is specifically designed to only connect with and fill bottles that are part of the dispensing system. When not in use, the filling probe 120 is contained within a the body of the dispensing machine.

In one embodiment, during refilling, the filling probe 120 descends from an opening in the top of filling chamber, either by way of a motor or a pneumatic system using pressurized air from the holding tank 220. When refilling is complete and the filling probe 120 is no longer needed, the probe 120 retracts back within the body of the dispensing machine and the opening from which it extends is covered, for example, by a sliding door. This protects the filling probe 120 from airborne contaminants. A cellular telephone or internet communication device 604 may be used for bi-directional communication with a dispensing unit CPU 112 via a Bluetooth or other wireless protocol. Bi-directional wireless transmission 612 provides a signal conduit for signals between CPU 112 and device 604, which may be operated by user 610. Device 604 may also be in bi-directional communication, via signals 606, with server 602. Server 602 is typically a computer with sufficient processing speed and memory. Server 602 is in bi-directional communication, via signals 608, with CPU 112. This enables a dispensing unit to identify a user and access filling information from a memory, a remote server 602, the device 604 or communication infrastructure. Filling preferences, account manipulation and/or filling procedure may be controlled through the device 604. The receptacle may also permit account information, filling data and user preferences to be exchanged with a personal computer, PDA or other processing device via a wireless network. Thus, a user 610, operating device 604 is able to communicate with CPU 112 of a dispensing unit as well as with a receptacle 400, having chip 444.

As depicted in FIG. 5, a cavity in the front of the machine, the filling chamber 146, houses the bottle, or receptacle 400 during the refilling process. The receptacle has an RFID chip 444. Another RFID chip 445 is mounted on the dispensing unit. While the RFID chip 444 is shown mounted on the receptacle, it is also an embodiment of the present invention that an RFID tag associated with a receptacle is located remotely from the receptacle. An optical sensor 447 is also mounted, disposed or embedded in the dispensing unit. The optical sensor 447 is used to detect a volume level in the receptacle 400. Exterior nozzle assembly 114 dispenses liquid into receptacle 400, which has cap body 404. The nozzle 114 is retractable into orifice 152. User interface, such as an LCD screen or plasma screen or touch-sensitive screen 116 and selection buttons 128(*a*), (*b*) and (*c*) are also shown.

As can be seen in FIG. 6, the floor of the filling chamber 146 contains a bottle dock, or mount 148, which is used to position and weigh the bottle 400 prior to refilling. The bottle dock, or mount 148 has a shape that is complementary to the shape of the bottom of the bottle 400. Preferably, the bottle dock 148 is dome-shaped, i.e., concave upwards as depicted in FIG. 6, in order to match and mate with the bottom of the compatible bottles 400, so that a bottle can be properly aligned with the filling probe 120. A digital weighing scale 162 beneath the bottle dock 148 detects when a bottle 400 is docked and weighs it. Based on the weight, the precise fill volume can be calculated to avoid over and under filling. Other elements (116, 128, 152 and 146) described in relation to FIG. 5 are not further discussed in relation to FIG. 6

Operation of the instant dispensing machine is controlled by an onboard computer, or CPU, shown in FIG. 4 as element 112. The computer 112 is responsible for operating the interface, monitoring information from the various gauges and sensors, opening, closing, and modulating electronic valves, lowering the filling probe, calculating filling volumes, and retaining machine information.

In addition to all of the major components listed above, the instant dispensing machine is also fitted with all of the necessary piping, valves, and sensors needed for operation.

FIG. 7 shows an expanded view of the nozzle 114 and receptacle cap portion 404.

Figure 8:
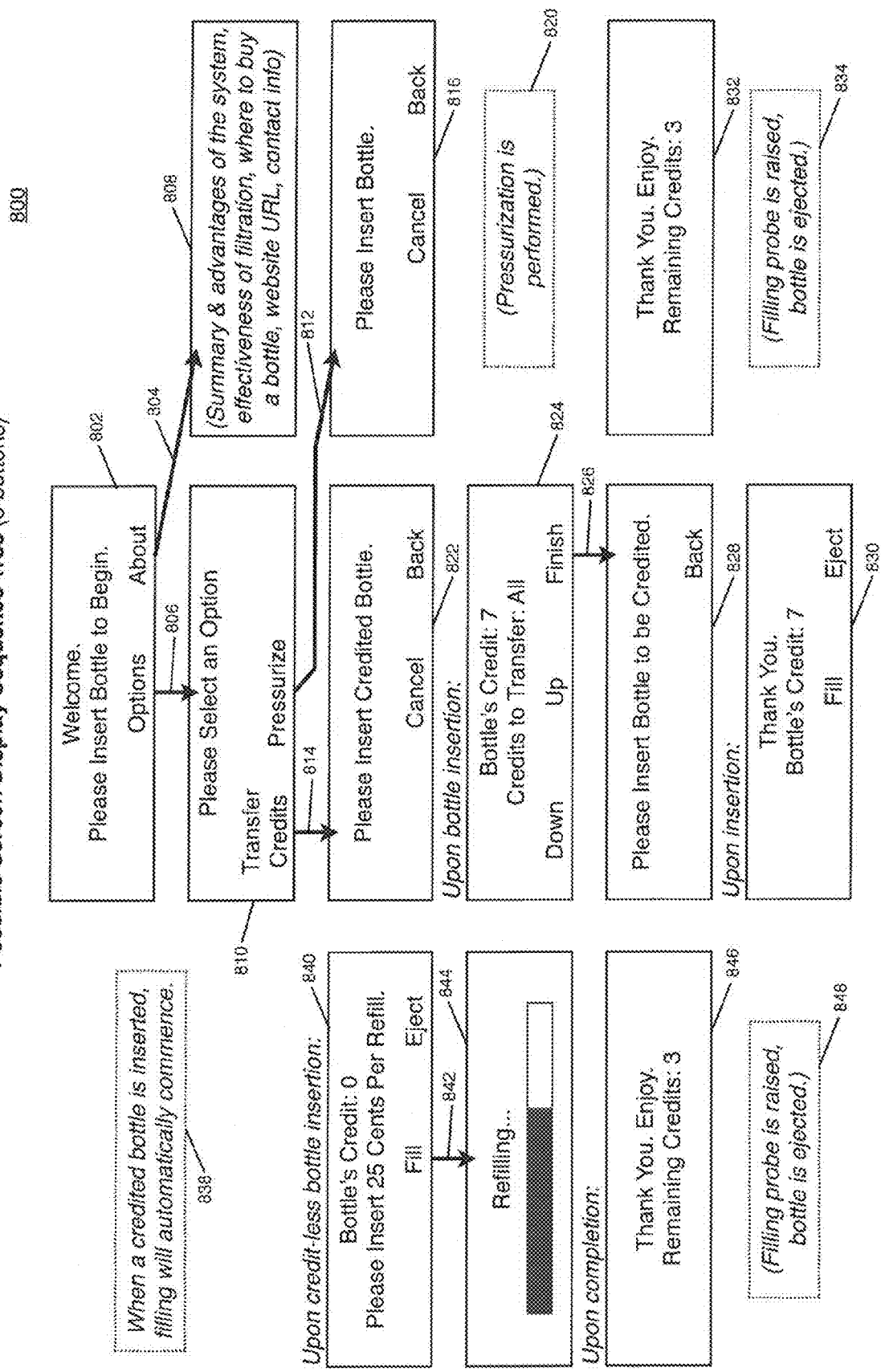
FIG. 8 shows a screen display sequence according to an embodiment of the present invention.

FIG. 8 shows a screen display sequence 800 according to an embodiment of the present invention. The screen display may be displayed on user interface as described herein. Display module 802 shows a welcome greeting. Line 804 shows that display 808 is displayed, which provides a summary and explains advantages of the system and describes how to use the system. This information includes, for example, locations where a bottle may be purchased, advantages of the system, website information and contact information.

Line 806 shows that a selection display 810 is displayed. Display 810 provides a user with instructions to select a transfer of credits from one account or receptacle to another account or receptacle. The user may also select pressurization of the receptacle.

Line 812 shows that an instruction to insert a bottle, or receptacle is displayed, as shown in display 816. The user is given the option to move to a different menu or cancel.

Line 814 shows that display 822 is reached. Display 822 requests that a user insert a credited bottle, or receptacle. Display 824 shows a display of credits for a bottle and credits to be transferred. Specifically, as shown in display 824, the bottle has 7 credits and all credits can be transferred. The user can increase (up) or decrease (down) the number of credits. Once the selection of credits is complete, the finish step is reached and line 826 shows that the user is instructed to insert the bottle or receptacle to be credited, as shown in step 828. Upon insertion, display 830 shows a message indicating the number of credits (7).

Referring back to display 816, when pressurization is selected, step 820 shows that the bottle is pressurized. Display 832 displays a message indicative of the remaining credits and step 834 shows that the filling probe is raised and the bottle is ejected.

Display 840 shows that a bottle with no credit may be filled, provided payment is received. Line 842 shows that display 844 displays a representation of the filling process. Display 846 shows the completed message indicating remaining credits (3). Step 848 shows that the filling probe is raised and the bottle is ejected.

Figure 9:
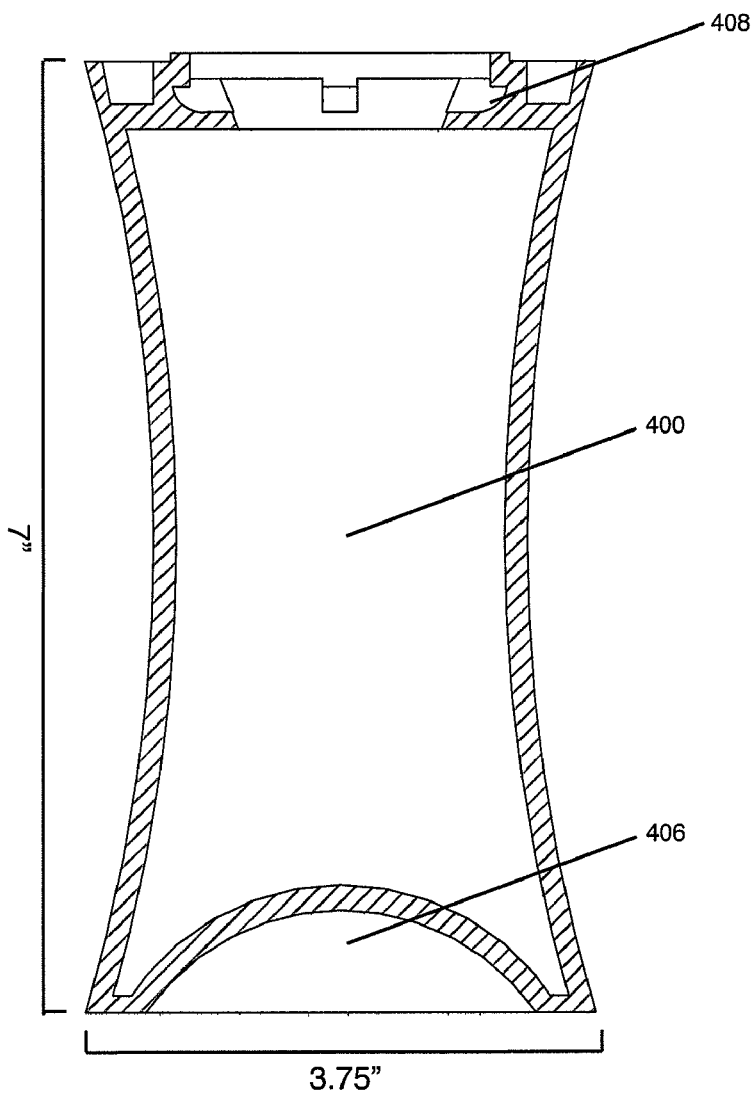
FIG. 9 shows a cross-section of the receptacle according to the present invention.

FIG. 9 shows that bottle, or receptacle 400 and a plurality of recesses (generally 408). The receptacle body 400 and receptacle mount interface, which may be a domed, or concave portion 406.

Figure 10:
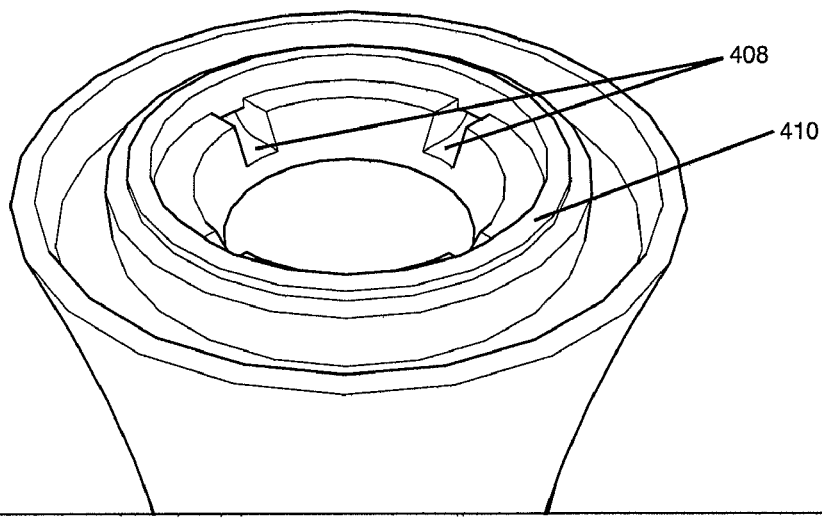
FIG. 10 shows a view of the upper portion of the receptacle according to the present invention.

FIG. 10 shows an upper view of the receptacle of the present invention. Recesses 408 and ring 410 are shown.

FIG. 11 shows a side view of the receptacle showing receptacle body 400, cap portion 404, activation button 416 and spout, or receptacle nozzle 412.

FIG. 12 shows a cut-away side view. Receptacle body 400, mounting interface 406 and receptacle cap 404 are shown. The receptacle cap 404 includes nozzle 412, valve shaft head 422, spring 424, compression slider 420, activation button 416, cap base 426, binding bolt 430 and valve shaft base 432.

FIG. 13 shows a top view of the receptacle according to the present invention. This view shows the upper surface of the receptacle cap body 404, the receptacle nozzle, or spout, 412 and cap spout orifice 414.

FIG. 14 shows another view of the receptacle top according to the present invention. Receptacle nozzle 412 is mounted on the receptacle cap body 404, which also supports activation button 416. Cap base member 426 and valve shaft base 432 are also shown.

FIG. 15 shows a bottom view of the receptacle top according to the present invention. The receptacle cap body 404, cap base 426, clips 440 (*a*) . . . (*d*) washer 434, binding bolt 430, recessed holes 436(*a*) . . . (*c*) and valve shaft assembly 438 are shown.

FIG. 16 shows another cut-away view of the top of the receptacle according to the present invention. Receptacle cap body 404 provides a support for nozzle 412, which is shown with an upper portion 412(*b*) and a lower portion 412(*a*). Valve shaft head 446 is attached to valve shaft base 432, which includes horizontal inlet 472. Compression slider 420, which has a tip 476, and cylindrical shaft 458 are also shown. Cap base 426, washer 434, washer 428 and reservoir 464 are shown. Recessed holes 436 are provided as well as spring 424. The main shaft 458 of the cap body is also shown.

FIG. 17 shows yet another cut-away view of the top of the receptacle according to the present invention. An extended platform 466, post 450, horizontal posts 452 and slide platform 456 are shown.

FIG. 18 shows yet another cut-away view of the top of the receptacle according to the present invention. Three guides 470 are shown. These guides provide a mechanism to position the related components. Extended platform 466, slide platform 456 and cylindrical shaft 458 are shown. Horizontal posts 452 provide a support means as does post 450. The functionality of these components is described in more detail herein.

FIG. 19 shows an expanded view of the top of the receptacle according to the present invention. Nozzle 412 is mounted to cap body 404, which also supports activation button 416. Orientation release pin 418 is interposed between cap body 404 and compression slider 420. Valve shaft head 422 and spring 424 are positioned between cap base 426 and cap body 404. Washer 428, binding bolt 430, valve shaft base 432 and washer 434 are also shown.

Figure 20:
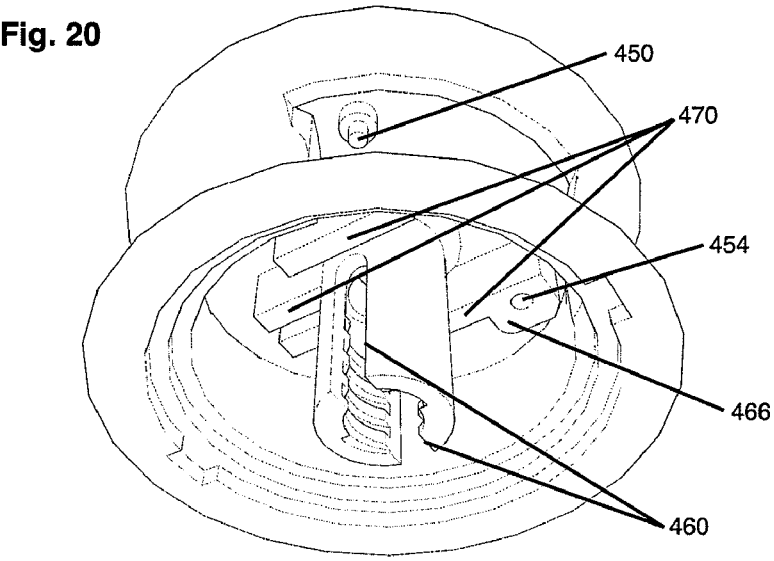
FIG. 20 shows a perspective view of the top of the receptacle according to the present invention.

FIG. 20 shows a perspective view of the top of the receptacle according to the present invention. Post 450, three guides (generally shown as 470), and a hole 454 in the cap body are shown. Extended platform 466 and two slots 460 are also shown.

Figure 21:
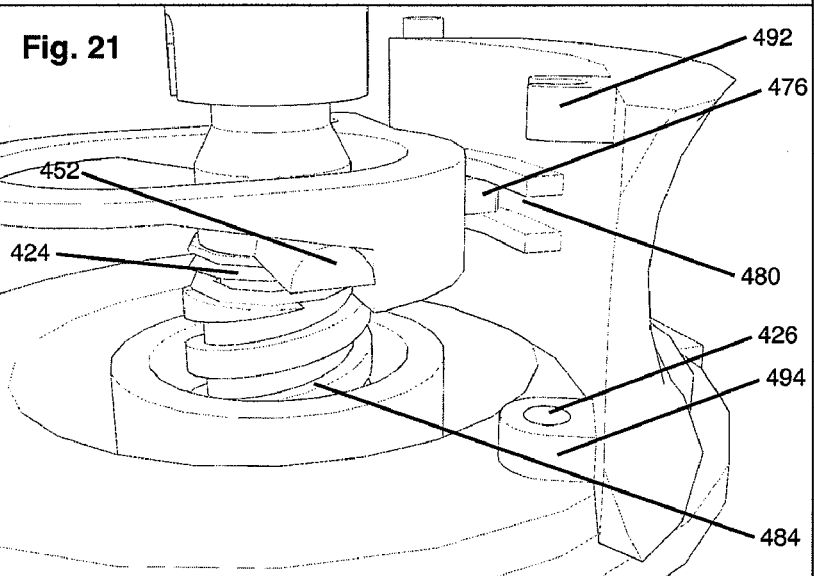
FIG. 21 shows a cut-away view of the top of the receptacle according to the present invention.

FIG. 21 shows a cut-away view of the top of the receptacle according to the present invention. Horizontal post 452 and spring 424 are shown. Tip 476 of compression slider is shown in track 480 and threads 484 of the binding bolt are also shown. Post of cap base 426 is shown connected to member 494.

Figure 22:
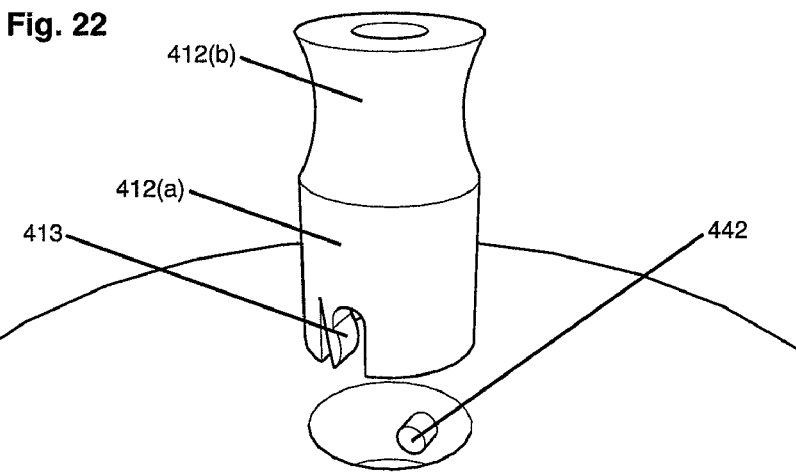
FIG. 22 shows a perspective view of the receptacle tip according to the present invention.

FIG. 22 shows a perspective view of the receptacle tip according to the present invention. Upper and lower portions 412(*b*) and 412(*a*), respectively, as well as slot 413 that interfaces with horizontal post 442 in the cap body. The slot 413 and the post 442 provide a mechanism to attach the lower nozzle 412(*a*) to the cap body.

Figure 23:
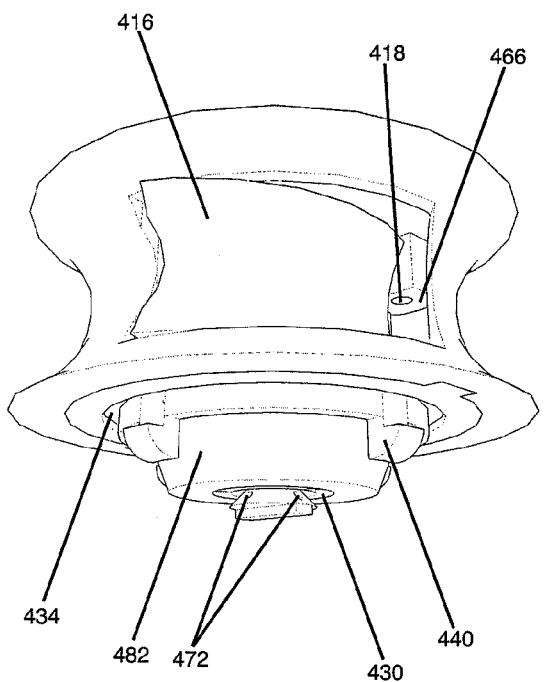
FIG. 23-26 show views of the top of the receptacle according to the present invention.

FIG. 23-26 show views of the top of the receptacle according to the present invention. FIG. 23 shows activation button 416, orientation pin 418, extended platform 466 in the upper portion of the cap body. Washer 434, tapered outside section 482, inlets 472, binding bolt 430 and clips 440 are also shown.

Figure 24:
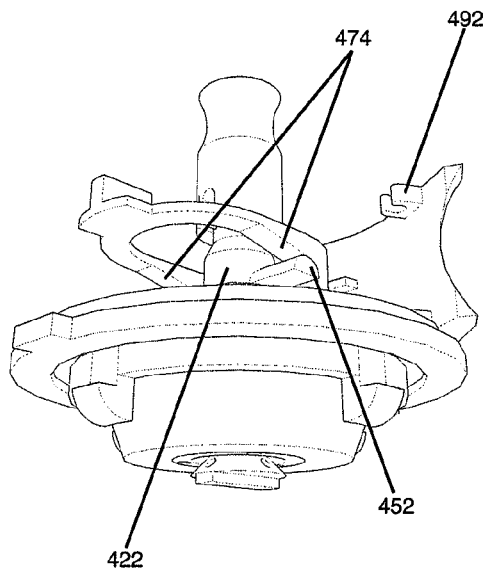
Figure 25:
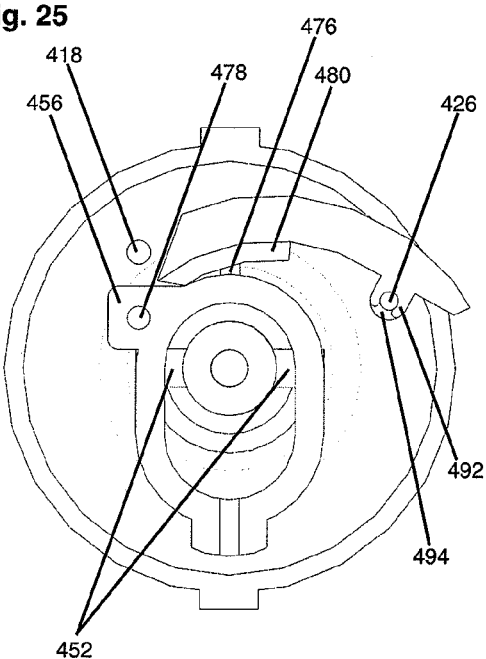

FIG. 24 shows ramped bottom surface 474 of the compression slide, valve shaft head 446, horizontal post 452 and connection mechanism 492 which is adapted to interface with a corresponding post (shown in FIG. 25).

FIG. 25 shows a top view relative to FIG. 24 horizontal posts 452, slide platform 456, orientation pin 418 and hole 478 are shown. Tip 476 of compression slider, track 480 are also shown. A post 426 interfaces with notch 492/494.

Figure 26:
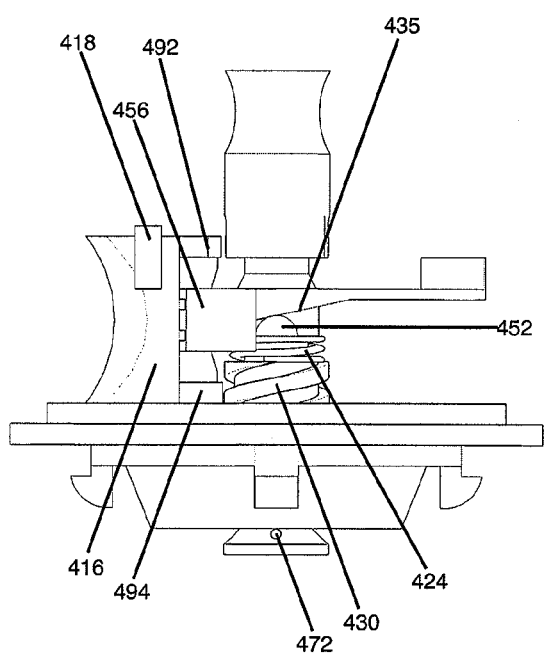

FIG. 26 shows a side view of the cap portion. Orientation pin is shown suspended in position as it would be in hole 454 (not shown) in cap body. Connecting mechanism 494 and 492 for activation button 416 are below and above slide platform 456, which has ramped portion (474, as shown in FIG. 24). Horizontal inlet 472, binding bolt 430, horizontal post 452 and spring 424, are also shown.

Figure 27:
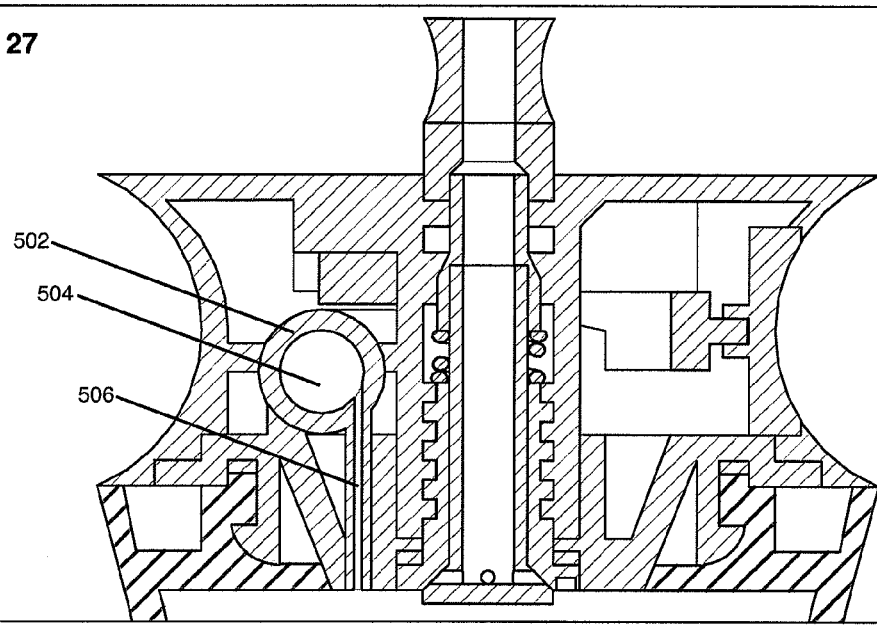
FIGS. 27-30 shows an embodiment of the present invention that utilizes a pressurizing unit in the cap.
Figure 28:
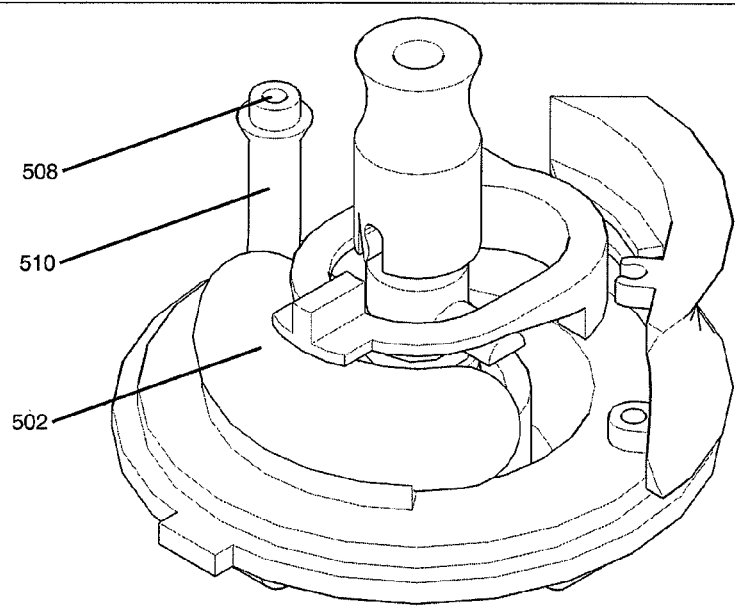
Figure 29:
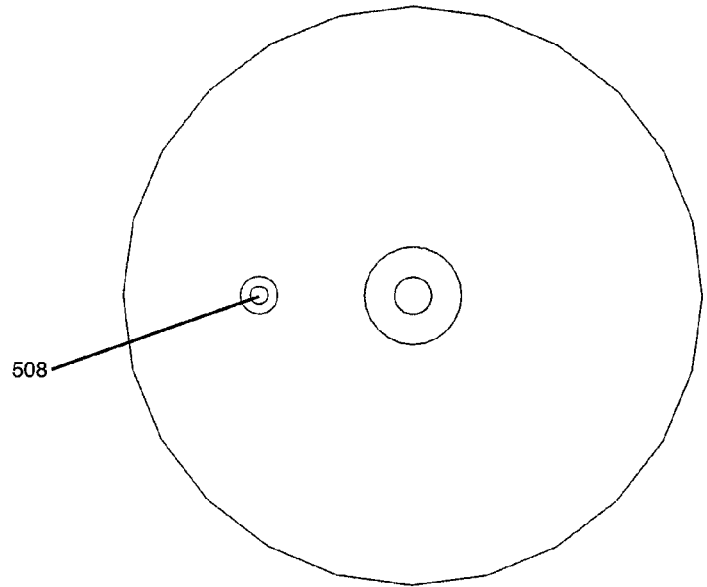
Figure 30:
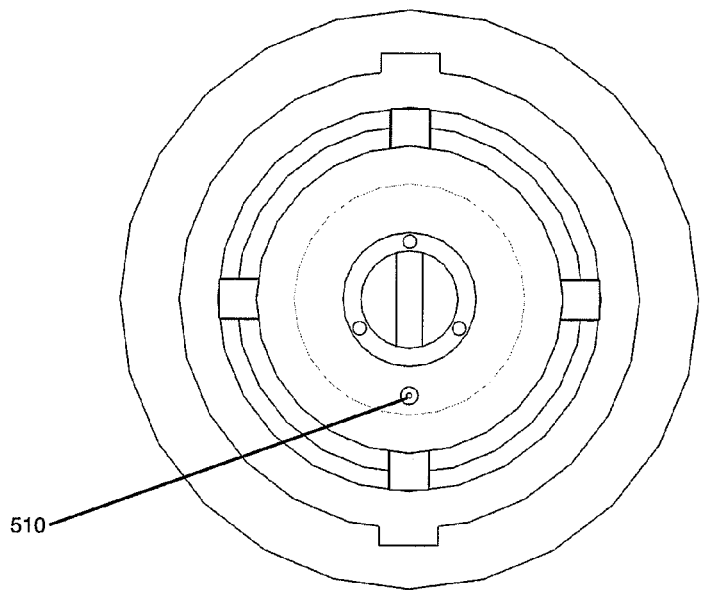

FIGS. 27-30 shows an embodiment of the present invention that utilizes a pressurizing unit in the cap. The pressurizing unit stores gas under pressure, increasing the pressurization of the reservoir as needed for liquid ejection from the receptacle. Alternatively, gas pressure from the pressurizing unit could drive water from the receptacle by means of a pneumatic plunger, similar to a syringe, pushing either upward or downward. Alternatively, a compressible bag inside the reservoir constricted by increasing the air pressure could be used. Specifically, FIG. 27 shows compression gas cartridge 502, a hollow region 504 and a liquid reservoir pressuring conduit 506. FIG. 28 shows a gas cartridge filling port 508 and a filling conduit 510. FIGS. 29 and 30 show top views of the cap with the pressurization feature.

For example, the bottle may be kept under pressure of air to enable forcible ejection of liquid from its drinking outlet, thereby decreasing the likelihood for airborne particles, superficial contaminants, saliva, or other such content which might compromise the internal cleanliness of the bottle from entering in.

The majority of diagrams and discussion in this document depict and refer to a bottle which accomplishes the desired forcible liquid ejection by means of keeping a liquid containing reservoir under gaseous pressurization. Another embodiment, as shown in FIG. 27-30, shows the present invention in a slightly different embodiment, also utilizing gas pressure as a propellant. Alternatively, several other non-gaseous methods might be used.

Figure 31:
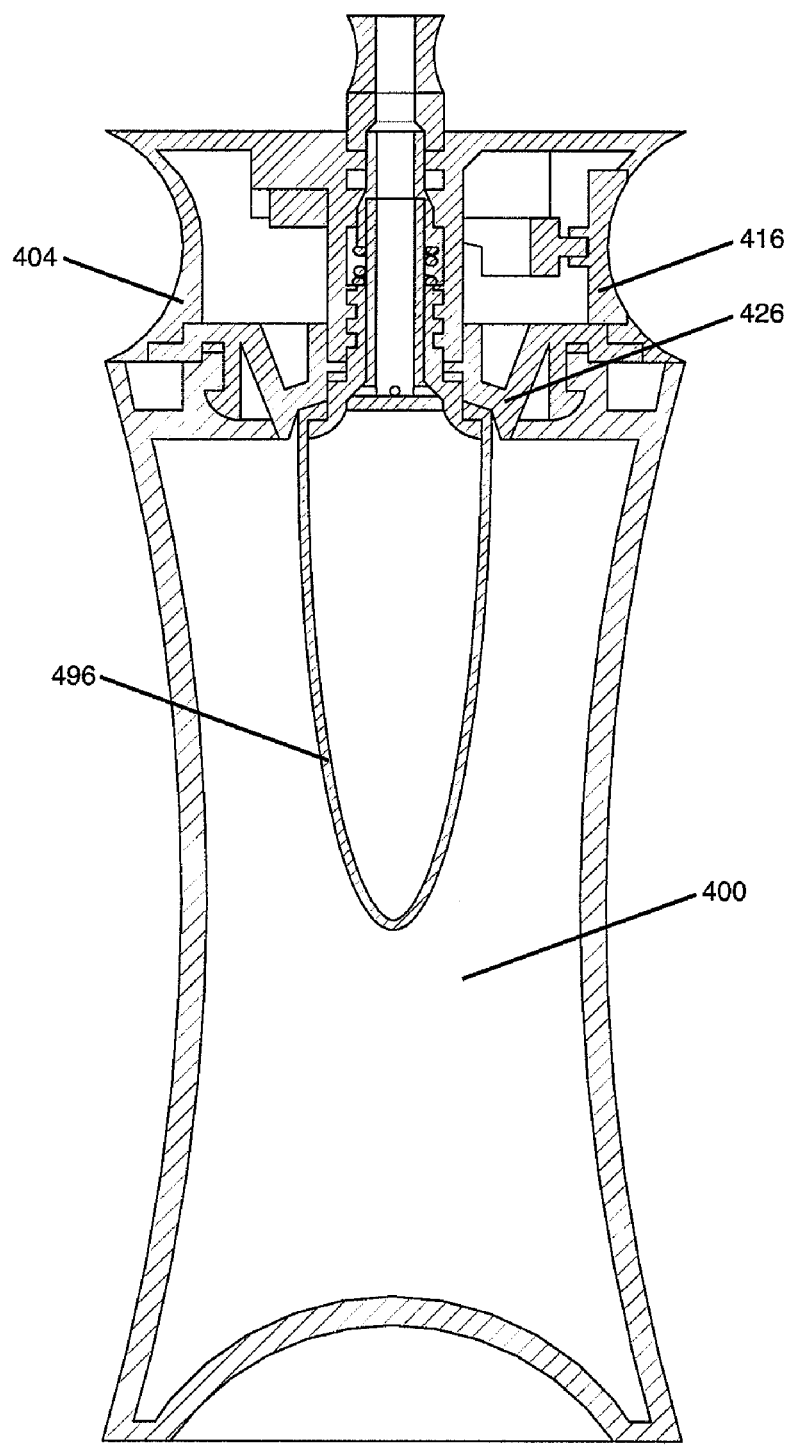
FIG. 31 shows a bladder inserted in the bottle to exert pressure on the contents in the bottle.

Another embodiment utilizes an elastic bladder for storing liquid and achieving the desired forcible ejection. FIG. 31 shows the present invention with the addition of elastic bladder 496 which expands upon being filled with liquid. The elastic property of the bladder 496 causes it to compress and forcibly eject contained liquid upon opening of the bottle valve. A minimum of liquid, ideally none, should remain in the bladder at the extent of its contraction. The bladder is designed to expand to occupy a maximum of available space in its enclosure, enabling the greatest possible capacity for liquid storage. Bladder shape throughout expansion and contraction might be controlled by variations in wall thickness, distribution of material, etc. to allow for optimal filling and discharging.

In addition to eliminating any potential risks associated with a high pressure, gas-filled bottle, this embodiment is likely to minimize bottle weight and manufacturing costs in comparison to the gas pressurized embodiment.

Additionally, the pressure may be input from the dispensing unit. The dispensing unit can store pressure data, which is associated with a particular receptacle. Thus, the receptacle will have the proper pressurization. This ensures the receptacle will not be over-pressurized or under-pressurized.

Referring to the various figure described herein, another aspect of the instant invention relates to a bottle 400 for use with the instant liquid dispensing machine. The bottle 400 is designed to store a liquid, such as drinking water, nutrient enhanced water, carbonated beverages or other liquids under the pressure of a gas and to be reusable multiple times. The bottle 400 consists of a plastic liquid reservoir, for containing the liquid and a cap 404 which contains multiple components of a valve system, an RFID chip 444, an activation button 416, and a drinking/filling port 414. The bottle is typically similar in size to other hand-held, totable bottles, where an average sized hand can grasp greater than half of the bottle's circumference at its widest part. The total volumetric capacity of the reservoir 464 can be any desired size. Typically, these handheld containers can be, for instance, 6 to 32 fluid ounces, 15 to 30 fluid ounces or 8 to 16 fluid ounces, depending on the variations in design.

The bottle 400 is designed to be filled by compatible dispensing machines and therefore, the cap 404 is preferably intended to remain affixed to the lower reservoir 464 of the bottle 400. This inhibits the user from opening and cleaning the bottle. Controlling the growth of microorganisms in the bottle 400 is addressed in two ways. First, the reservoir 464 is optionally constructed, treated or coated with a substance, such as for example, silver-ion based antimicrobial plastic, that reduces or eliminates the growth of harmful micro organisms. Second, the bottle 400 is optionally pressurized with filtered air upon refill by a compatible dispensing machine. This allows the entire liquid contents of the bottle to be emptied by means of air pressure within the reservoir, forcing liquid out through an outlet in the cap. The force of the liquid flow escaping through the top of the cap 404, discourages any outside contaminants from entering the reservoir. These two features help keep the bottle sanitary throughout its operation life which is typically three months-six months.

The bottle 400 may be filled with filtered water and pressurized with air at the time of refill. Air pressure within the reservoir 464 functions as a propellant for dispensing water from the bottle 400. The bottle 400 should remain pressurized at a level adequate for complete liquid discharge for an extended period of time. For example, if volumetric capacity of the reservoir 464 is 20 ounces and 16 ounces of water were added, the reservoir would need a minimum of 75 psi of air pressure in it to force out all of the liquid (4 oz of a gas at 75 psi can expand to 20 oz at atmospheric pressure (~15 psi)).

Activation button 416 may be located on the side of the cap 404 to allow the user to mechanically open the valve and release water when desired at variable forces. The button 416 typically will not engage unless the bottle 400 is angled back a minimum of 90°, preventing the de-pressurization that would result from opening the valve when the bottle 400 is positioned upright.

A radio frequency identification (RFID) chip 444 is incorporated into the cap 404 of the bottle 400. Basic information is stored in the bottle's RFID chip 444. The chip 444, which may be for example a transponder chip, holds prepaid credits for redemption at any compatible refilling machine. The chip 444 accepts additional crediting by the machine.

A short-range radio frequency protocol may be used to allow communication between the transponder chip 444 in the bottle 400 and a transceiver 445 in the dispensing unit 102. The communication range is typically between approximately 3 inches to 2 feet, although the communication range depends on the RF power. Therefore a passive type chip, that does not require an internal power source, is preferable. The RFID tag receives the necessary power for operation from the incoming radio frequency signal of a machine's transceiver.

Electrically Erasable Programmable Read-Only Memory (EEPROM) contained in the chip 444 can accommodate the changes in the chip's credit information. The chip 444 is therefore writable and able to be updated with new data during every refill. Credit information may be encrypted to thwart hacking and unauthorized crediting.

The chip may also store information such as the date of first use, refill history, the bottle owner, and user preferences, such as their preferred refill temperature.

In one embodiment, the complete bottle 400 is composed of two main sections. The lower portion is the liquid reservoir 464 and consists of a single piece of high-strength molded plastic. The upper portion 404 functions as the cap for the bottle and consists of a multiple component mechanism that facilitates filling and discharging contents.

Reservoir

The reservoir 464 may be a single chamber which stores the liquid, such as water or other beverage and the compressed gas in the bottle 400. The reservoir 464 is, for example, a hollow, semi-cylindrical single piece of molded plastic with an opening at the top. It is designed to pair with the cap structure to complete the bottle.

The reservoir 464 is typically made of high-strength, antimicrobial plastics. For example, silver-ion based antimicrobial plastic or another type of effective antimicrobial and anti-fungal plastic may be used. This plastic typically curbs the presence and proliferation of microorganisms to within acceptable ingestion levels.

The characteristics of the plastic used to form the bottle 400 typically include extremely strong and rigid, but not to the point of being brittle. It should be durable enough for general everyday use, from urban to elemental settings, and able to resist fracturing due to drops from a reasonable height.

Certain design elements may be used to increase the entire bottle's structural integrity against inner pressure without the use of additional material. The side walls can curve in towards the center, resisting outward flexing through the structural principals of an arc. The bottom of the bottle may be upwardly domed, which combats outward flexing in a similar manner.

The domed base 406 of the bottle 400 also serves a secondary function that at a compatible refilling machine, the bottle will set positively on an equally proportioned convex dome base, properly aligning it for refilling.

More specifically, one example of a design includes four recesses molded into the upper, inner lip of the reservoir top accommodate four clips of the cap base. This facilitates a secure and permanent coupling of the cap structure and reservoir when assembled.

An alternate embodiment includes providing a locking thread system that could be used to permanently couple the cap and bottle.

The cap structure 404 as described herein includes, for example, 12 individual components which create a single piece once assembled. The cap contains a valve system for releasing and filling the reservoir, an external button 416 to open the valve, an RFID chip 444, an orientation dependent release device, and threads or clips or attachment members for coupling with the reservoir 464 all in a single enclosure.

The cap body 404 is typically made of molded plastic. It gives the cap its shape and houses the internal components. In one embodiment, the entire side circumference of the cap body is grooved so that it may be held comfortably and securely in the hand. An opening along its side and hinge post accept the activation button 416. A cylindrical shaft 458 extends from an opening at the top center of the cap body downwards past the outer sides. Components making up the valve fit into the shaft. The inside of the lower portion of the shaft 458 is threaded. Two cuts 460 travel roughly two-thirds of the way up the shaft 458 on opposite sides. Three guides 470 for the compression slider 420 extend from the inner roof of the cap body, with an extended platform containing a deep cylindrical hole 454 for the orientation release pin.

The valve shaft 448 is, for example, a tubular metal shaft which extends from approximately the top surface to the lower surface of the cap. Its function is to be a conduit for water exiting the bottle during dispensing and entering during filling. A corrosion resistant metal, such as anodized aluminum, may be used due to its contact with liquid contents. The valve opening amount and resulting liquid release volume and pressure can be controlled by user input. The valve shaft assembly 438 is two pieces, the valve shaft head 446 and valve shaft base 432. Two pieces are used to facilitate assembly of the cap structure, and are joined together by threads.

The valve shaft head 446 has two horizontal posts 452 that extend from opposite sides. The posts receive downward pressure from the compression slider 420 and lower the entire valve shaft assembly 438. Its inner lower section contains female threading.

The valve shaft base 432 contains four, approximately 1-2 millimeter diameter horizontal inlets which extend into the hollow center of the valve shaft. They are located on the tapered lower rim of the valve shaft base 432. Water is forced through these inlets when exposed to the pressurized reservoir. The upper area contains male threads.

Compression Slider

The compression slider 420 is a molded plastic, ring-like component used to lower the valve shaft assembly 438. It is positioned around the main shaft 458 of the cap body. When moved horizontally, the ramped bottom of the compression slider 420 gradually puts pressure on the two posts 452 of the valve shaft head 446, opening the valve. A small tip protruding from its back end fits into the inner track 480 of the activation button 416. A side, sliding platform 456 similar opposed to a complimentary platform on the cap body contains a cylindrical hole 478 for the orientation release pin 418. This hole and the hole within the cap body align when the valve is closed. The extent at which the valve shaft assembly is lowered correlates to the horizontal position of the compression slider 420 within its range of motion. Due to the slope of the bottom of the compression slider, the user can control the rate and force at which water is released from the bottle 400.

Spring

A short coiled compression spring typically between 6 and 8 millimeters in length) is positioned around the valve shaft base 432 between the valve shaft head 422 and binding bolt 430. Its role is to help the valve return to a closed position by keeping upward pressure on the horizontal posts of the valve shaft head 422. It also gives the activation button 416 a positive feel.

Orientation Release Pin

The orientation release pin 418 is a cylindrical solid metal pin which prevents the activation button 416 from being engaged unless the bottle 400 is angled past a certain degree. If the valve were opened when the bottle is upright (cap above reservoir) only air would escape, draining the reservoir of the air pressure needed to release the liquid contents. When the bottle is upright, the pin 418 falls to the bottom of the cylindrical hole 478 within the compression slider. The top portion of the pin extends into the hole 454 in the cap body, disabling horizontal movement in the compression slider 420. When the bottle 400 is angled back beyond 90° for drinking, gravity will cause the pin 418 to drop completely into the hole 454 in the cap body. The compression slider 420 can now slide without restriction.

The angle necessary to engage the button could be changed by altering the angle of the combined shaft in which the pin travels.

Activation Button

The activation button 416 is located on the side of the cap and allows the user to open the valve and modulate the release of the liquid contents in a trigger-like manner. Made of molded plastic, it fits into the opening on the side of the cap body and continues its outer profile. It swivels by means of a hinge, where an upper and lower ring, 492 and 494, respectively, extending from the inside of one side of the activation button 416 rotate around posts on both the cap body and the cap base.

The protruding tip 476 of the compression slider 420 fits into a track on the inside face of the activation button 416. When the button 416 is pressed it applies the necessary horizontal motion to the compression slider 420 for opening the valve. When holding the bottle for drinking, the activation button 416 is intended to be positioned under the index finger of the right hand. Water is released at a force dependent upon how far the button is pushed inwards.

Cap Base

The cap base 426 is typically one piece of molded plastic. Its function is to be the lower cover of the cap and to provide the means for permanent attachment to the reservoir. It may also be constructed of an antimicrobial plastic. The cap base fits into the lower inner lip of the cap body and has a hole in its center to accommodate the valve system.

The tapered outside center section 482 of the cap base creates a seal against the reservoir 464 opening when in place.

In one embodiment, four clips 440(*a*) . . . (*d*), each 90° apart, extend downwards from the top of the cap base. They are designed to "lock" the cap onto the reservoir 464 for the life of the bottle 400 once snapped into the four recesses 436(*a*) . . . (*d*) of the reservoir 464.

Additional clips could be used to further secure the coupling of the cap and reservoir.

Binding Bolt

The binding bolt 430 is used to fasten the cap body and cap base and to guide the valve shaft assembly 438. It is typically a wide diameter bolt with large threads 484, a hollow center, and a flanged base. It could be made of either a lightweight, corrosion resistant metal or high-strength antimicrobial plastic. Once the cap base is put in place, the binding bolt 430 can be screwed into the threads of the cap body, bolting the two components. The lower section of the center channel tapers outwards complimentary to the bottom of the valve shaft base 432, creating a snug fit when the valve is closed. Force from the spring 424 and the air pressure underneath ensure a tight seal.

A thin latex or other synthetic rubber-like coating could be applied to the tapered inner section of the binding bolt 430 to improve sealing of the closed valve.

Washers

Typically two rubber washers 428 and 434 are used to prevent liquid and pressure leaks. A smaller washer 428 is placed between the flange of the binding bolt 430 and center ring of the cap base. Another larger washer 434 is placed between the rim in the cap base and a short ridge 410 along the top of the reservoir 464.

Nozzle

The nozzle 412 helps the user aim the fluid exiting the bottle 400 or acts as a mouthpiece from which to drink, depending upon preference. It may be the only user removable piece of the bottle. The lower portion 412 (*a*) is typically made of molded plastic while the upper portion 412(*b*) is typically made of hard, durable rubber. The nozzle 412 fits over the top of the valve shaft head 422 and inside the top center of the cap body. Two opposing clips 440(*a*) and (*b*) may be molded into the lower section to click into place around two small protruding horizontal posts 442 molded into the inner main shaft of the cap body. The clips 413 allow for secure yet easily removable attachment of the nozzle 412. The nozzle 412 is typically removed before filling so that a refilling machine can make the correct seal with the top of the valve shaft assembly 438. Removing the nozzle 412 also allows it to be cleaned by hand or in a household dishwasher, or replaced if necessary. Multiple colors may be used for the upper and/or lower section to help differentiate and personalize individual bottles.

Overview of Content Release Sequence

When drinking is desired, the bottle 400 is picked up by the user. The bottle should be orientated so that the activation button 416 is between "12" and "3" o'clock when looking down over the top of the cap. The thumb and index or middle finger grip the cap in the deep groove around its side. The ring and/or pinky and/or middle (if not around the cap) fingers may be placed on the upper side of the reservoir 464 for support while holding the bottle. This natural position for the right hand will place the activation button 416 directly under the index or middle finger, enabling dispensing with a slight squeeze of the hand. When the bottle 400 is tilted back towards the user past 90°, the orientation release pin 418 falls clear of the compression slider 420 and the activation button 416 becomes unlocked. When the activation button 416 is pushed, it slides the compression slider 420 which steadily lowers the valve shaft assembly 438 against resistance from spring 424 and air pressure. Water will immediately begin exiting the bottle 400 through the valve shaft assembly 438 as the inlet holes at the bottom of the valve shaft base are exposed to the reservoir 464. When the button 416 reaches its furthest point of travel, the valve shaft assembly 438 is lowest, water enters the inlets with minimum resistance, and consequently water is dispensed at the greatest rate.

Water leaving the bottle should travel as a narrow stream as opposed to a wide spray. The user will place their mouth around the nozzle 412 while drinking. The user may also choose to drink by holding the bottle a few inches from the face and directing the water stream into their open mouth, with or without the nozzle 412 attached.

Bottles come in an array of sizes differing in dimensions from the one shown.

The air pressure needed to expel the liquid from the bottle could alternatively be stored in a tank or cartridge independent from the main liquid reservoir, possibly in the cap. By increasing pressure in the main reservoir only when required for drinking, certain hazards or problems associated with continually keeping the entire reservoir highly pressurized might be alleviated.

Rubber bumpers could be placed at main contacts points on the bottle to increase its durability by lessening the shock of a drop. The reservoir could also be rubberized.

A hole could be molded into the bottle to allow attachment of a strap, clip, or other such devices for providing additional carrying options.

A device for allowing excess reservoir pressure to escape could be implemented. This device would reduce pressure to operating levels if the bottle was tampered with or inaccurately pressurized by the machine. It could be a spring based pressure release valve rated to a certain psi in the cap, or instead a simple conical rubber plug positioned in a hole in the bottom center of the bottle.

Overview of Filling Sequence

An empty, credited bottle 400 is placed on the bottle dock 170. The filling probe 120 will lower once the machine has both communicated with the chip within the bottle 444 and the scale 162 has had static weight on it for a minimum of one second that is within range of the weight of an empty bottle 400 to the weight of a full one. These requirements are designed to discourage the tampering that might occur if the filling probe 120 was always exposed. The machine has determined that the bottle 400 is eligible for a refill and will begin the filling procedure automatically. The filling probe 120 lowers onto the top of the bottle, opening the bottle valve and creating a tight seal. Any remaining air pressure in the bottle is drained. An electronic valve 106 on the water line opens at the bottom of the filling probe 120 as filtered water is pumped from the reservoir 122 through the line 132 and into the bottle 400. A volume meter 108 precisely measures the amount of water passing through the end of the water line and is monitored by the CPU 112. The electronic valve is abruptly closed after target dispensing. The bottle is next pressurized. An independent air line 130 travels from the holding tank 220 to the bottom of the filling probe 120. An electronic valve 104 opens, forcing air into the bottle. An electronic pressure gauge 144 monitors the pressure in the bottle and shuts the valve when the target pressure is reached. The filling probe 120 is quickly lifted from the surface of the cap to minimize the time the valve is open and retracted back into the machine. The screen 116 will display that filling has been completed. If a partially filled bottle is inserted, the information from the digital scale 162 beneath the base of the bottle dock 176 is used by the CPU 112 to calculate the precise fill volume. Information from the volume meter 108 on the water line 132 is also used to determine when the water level in the reservoir is low, causing the valve 136 between the main water line and the filtration unit to open. The CPU 112 keeps record of the total amount of water dispensed so that the filter 138 and other components may be serviced/replaced at the right times.

A shield door could slide or revolve over the front of the filling chamber while a bottle is docked to prohibit the user from interrupting the filling process.

Additional ultraviolet lamps could be placed in the filling chamber to sterilize the bottle and any water inside while docked, in the case of a translucent receptacle.

To satisfy filling demands in higher traffic locations, an alternative to using multiple machines could be a single larger machine with multiple interfaces and filling chambers. The internal components would be made larger and shared when possible.

Further, for a larger application requiring several filling machines located independently, filtering, cooling, and storage components might be centrally located and serve numerous remote kiosks via a network of plumbing, thereby decreasing costs compared to purchasing single machines.

Certain machines could be manufactured to include a bottle dispenser. These machines would be used when placed independent of a business or retailer capable of selling the bottle, such as in an office building, a gas station with no shop, or public space. The purchase of a bottle would be done through the machine interface and money collection unit.

Some of the machines could be outfitted with the necessary machinery and chemicals to perform routine cleaning of the bottle. Cleaning could be accomplished by modification of the filling probe, or by a separate addition to the machine designed specifically for bottle cleaning.

Machines could communicate with a remote server by means of a phone line, wired or wireless internet connection, or even wirelessly through the cellular phone infrastructure. Access to a centralized resource specifically for this closed system of drinking water would allow various benefits.

A machine could "phone home" when service is needed. A repair person could be dispatched if a problem was detected. Also, because the exact volume of water filtered is being logged by the CPU, the filter can be serviced/replaced at the appropriate intervals. Remote troubleshooting could be done for a machine experiencing software based issues.

Bottle credit information could be kept on the server. This is an alternative to storing the credit information within the chip in the bottle, using the chip to instead contain each bottles' unique identification number. When a bottle is docked, the machine would contact the server and be able to view, add, and deduct credits. This technique for storing credits would eliminate the risk of unauthorized credit hacking with the credit-information-in-bottle approach. The use of a magnetic card or RFID keychain or other hardware device with wireless communication capabilities such as a cellular telephone or internet communication device such as a PDA (personal digital assistant), could also be used to identify a user, as opposed to an individual bottle.

When the credit information is kept online, or at a common server location, users could have access to a system specific website. After logging in under a created account, they could then increase their credits by prepaying with a credit card or PayPa™. Credit card information could also be saved and set up to deduct owed balances weekly or monthly, or other predetermined time period. Multiple bottles could be registered under a single account to aid families and businesses. The website might also provide the user information about the total amount of water consumed, their average daily, weekly, etc. consumption, and even track their progress against user set goals for daily water consumption.

Interface software and any firmware for the digital components could be downloaded and updated from the server to one or more dispensing units, as described herein.

Additionally, it is an embodiment of the present invention that user data includes preference data and/or account data. Thus a user can have associated preferences such as nutrient water, hot water, for tea, or other particular tastes. The user data may also include account data such as credit card information, account balance information, an account to draw additional funds from, user name and other account information.

Another embodiment of the present invention is that the first RFID transceiver unit accumulates receptacle information. Thus, the RFID unit may contain information regarding the volume of an associated receptacle, the cleaning history, (i.e., when the last sterilization operation occurred), and the type of liquids dispensed into the receptacle. Furthermore, the receptacle information may include receptacle capacity, volume of liquid in the receptacle, and internal pressure of the receptacle. A cellular telephone or internet communication device (604) may be used for bi-directional communication with a dispensing unit via a Bluetooth or other wireless protocol. This would enable a dispensing unit to identify a user and access filling information from a memory, a remote server (602), the device or communication infrastructure. Filling preferences, account manipulation and/or filling procedure may be controlled through the device (604). The receptacle may also permit account information, filling data and user preferences to be exchanged with a personal computer, PDA or other processing device via a wireless network.

An optical sensing unit may be mounted on the dispensing unit, as described herein. The optical unit can be used to optically sense a volume level of a receptacle. The optical sensing unit may be used to ensure that the appropriate volume of liquid is dispensed into the receptacle. This feature is particularly useful when a user is re-filling a receptacle that is not completely empty so a partial filling operation is required.

Additionally, as shown in FIG. 1, a compressed air tank 126 may be mounted in the outer casing 102 of the dispensing unit such that the dispensing unit can pressurize a receptacle. Alternatively, the receptacle 400 may include a pressurizing unit that provides pressure to the receptacle. The pressurizing unit in the receptacle 400 may include an actuatable member that upon actuation generates internal receptacle pressure. This pressurizing unit may be, for example, a lever that is pumped, a ratchet, or a pump). It is also an embodiment that the receptacle, or container, may be de-pressurized.

As described herein, the present invention also includes a liquid container that includes a fluid containing portion, a lid portion operably connected to the fluid containing portion, a pressure sensing unit adapted to sense an internal pressure level of the liquid container, and a volume sensing unit adapted to sense a volume of the container.

There may be a plurality of dispensing units, and a network, wherein the plurality of dispensing units are in communication with each other via the network.

It is also an embodiment of the present invention that there is a method for dispensing liquid. The method includes:
inserting a container into a filling unit;
identifying the container based on container information stored in the container;
establishing container characteristics based on the container information;
dispensing a predetermined volume of liquid into the container; and
applying gaseous pressure into the container.

The dispensing step further includes selecting a dispensing operation based on the container characteristics. Also, the account balance, associated with a receptacle, may be decreased, based on the liquid dispensed. Also funds may be added to an account; to increase an account balance, associated with a container.

It is also an embodiment that the container information is transmitted via a network user account.

It is also an embodiment of the present invention that the receptacle is tamper proof and may receive liquid from an authorized dispensing units only. Thus, the receptacle may only receive liquid from authorized dispensing units to maintain the integrity of the receptacle.

Furthermore, the dispensing apparatus may also be adapted to dispense receptacles. The receptacles may be stored in the outer casing of the dispensing unit.

It is also an embodiment of the present invention that the dispensing apparatus cleans receptacles. The cleaning process may include introduction of a cleaning chemical, detergent, oxygenated water, ozinated water, high temperature (e.g., over 100° F.) water, or steam or other cleaning or sterilization procedure. The sterilization may sterilize the receptacle and/or contents currently residing in the receptacle.

Furthermore, the liquid in the dispensing unit may be moved through compressed air to push liquid inside the dispensing unit.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. An apparatus comprising:
   a dispensing unit comprising:
      a filtration unit adapted to filter a liquid;
      a reservoir unit for containing a supply of liquid to be dispensed;
      a pump unit, operatively coupled to the reservoir unit, to pump the liquid from the reservoir unit;
      a conduit unit, operatively coupled to the reservoir unit, to dispense liquid, the conduit unit having a retractable unit and an orifice;
      a compressor unit, operatively coupled to the conduit unit, to provide pressurization of the receptacle to store the liquid under pressure to facilitate subsequent discharge of the liquid from the receptacle; and
      a sterilization unit, operatively coupled to the filtration unit, for sterilizing the liquid prior to dispensing into the receptacle;
      a control unit, operatively coupled to the conduit unit, for controlling liquid dispensed by the conduit unit; and
   a receptacle unit comprising:
      a container unit for containing liquid; and
      a lid unit, attachable to the container unit, the lid unit adapted to discharge liquid due to the pressure in the receptacle.

2. The apparatus as claimed in claim 1, wherein the receptacle is pressurized to a particular pressure to facilitate dispensing liquid from the receptacle.

3. The apparatus of claim 1, wherein the lid unit further comprises:
   a body member having an actuator unit; and
   a base member.

4. The apparatus as claimed in claim 1, further comprising:
   a compressed gas unit adapted to provide compressed gas to the receptacle unit.

5. The apparatus as claimed in claim 4, wherein the compressed gas unit is detachable from the receptacle unit.

6. The apparatus as claimed in claim 4, wherein the compressed gas unit is adapted to be recharged by dispensing unit.

7. The apparatus as claimed in claim 1, wherein the compressor unit provides compressed gas that is added to the liquid to form a mixture and the mixture is dispensed by the conduit unit.

8. The apparatus as claimed in claim 1, wherein the receptacle is depressurized by the dispensing unit.

9. The apparatus as claimed in claim 8, further comprising a mass sensing unit adapted to sense the mass of the receptacle,
   wherein the mass sensing unit determines a mass of the receptacle to determine an amount of liquid to dispense, the conduit unit provides the determined amount of liquid and the pressure gauge determines an amount of pressurization for the receptacle based on the liquid dispensed.

10. The apparatus as claimed in claim 9, wherein the receptacle is adapted to be repeatedly pressurized.

11. The apparatus as claimed in claim 1, further comprising a pressure gauge unit adapted to sense an internal pressure of the receptacle.

12. The apparatus as claimed in claim 11 wherein the pressure gauge is disposed in the dispensing unit.

13. The apparatus as claimed in claim 11, wherein the pressure gauge is disposed in the receptacle.

14. The apparatus as claimed in claim 1, wherein the conduit unit dispenses compressed gas based on the volume of the liquid in the receptacle.

15. The apparatus as claimed in claim 1, further comprising:
   a first RFID transceiver unit disposed in the receptacle for storing information related to the receptacle.

16. The apparatus as claimed in claim 15 further comprising:
   a second RFID transceiver unit disposed in the dispensing unit.

17. The apparatus as claimed in claim 16, wherein the second RFID transceiver unit obtains information from the first RFID transceiver unit.

18. The apparatus as claimed in claim 17, wherein the first RFID transceiver unit transmits user data to the second RFID transceiver unit,
   wherein the user data is used by the dispensing unit to dispense liquid into the receptacle.

19. The apparatus as claimed in claim 18, wherein the user data includes preference data and/or account data.

* * * * *